United States Patent
Sharma et al.

(10) Patent No.: US 10,142,039 B2
(45) Date of Patent: *Nov. 27, 2018

(54) INTEGRATED CIRCUIT CALIBRATION ARCHITECTURE

(71) Applicant: pSemi Corporation, San Diego, CA (US)

(72) Inventors: Vikas Sharma, Reading (GB); Mark James O'Leary, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,366

(22) Filed: Apr. 27, 2018

(65) Prior Publication Data

US 2018/0248633 A1   Aug. 30, 2018

Related U.S. Application Data

(63) Continuation of application No. 15/658,256, filed on Jul. 24, 2017, now Pat. No. 9,991,973, which is a
(Continued)

(51) Int. Cl.
*H04B 17/10* (2015.01)
*H04W 24/06* (2009.01)
(Continued)

(52) U.S. Cl.
CPC .............. *H04B 17/14* (2015.01); *H04B 1/40* (2013.01); *H04B 17/13* (2015.01); *H04B 17/19* (2015.01)

(58) Field of Classification Search
CPC ........ H04B 17/11; H04B 17/14; H04B 17/13; H04B 17/19; H04B 17/10; H04B 17/21; H04W 24/06
See application file for complete search history.

(56) References Cited

U.S. PATENT DOCUMENTS 9,991,973 B2    6/2018   Sharma et al.
2013/0217343 A1*  8/2013   Tenbroek .............. H04W 24/00
                                                                   455/77
(Continued)

OTHER PUBLICATIONS

Boetzel, Ulrich, Written Opinion received from the EPO dated May 29, 2018 for appln. No. PCT/US2017/039592, 9 pgs.
(Continued)

*Primary Examiner* — Blane Jackson
(74) *Attorney, Agent, or Firm* — Jaquez Land Greenhaus LLP; Martin J. Jaquez, Esq.; John Land, Esq.

(57) ABSTRACT

A calibration architecture that enables accurate calibration of radio frequency (RF) integrated circuits (ICs) chips used in transceiver RF systems in a relatively simple testing environment. Embodiments of the invention include one or more on-chip switchable internal calibration paths that enable direct coupling of a portion of the on-chip circuit to an RF test system while isolating other circuitry on the chip. Some embodiments allow interconnection of switchable internal calibration paths between separate IC chips. Still other embodiments utilize internal switches and antenna mutual coupling to provide over-the-air calibration, alone or in combination with direct signal coupling via internal calibration paths. Periodic self-calibration of an RF IC can be performed after initial factory calibration, so that adjustments in desired performance parameters can be made while such an IC is embedded within a final system, and/or to take into account component degradation due to age or other factors.

19 Claims, 16 Drawing Sheets

Related U.S. Application Data continuation-in-part of application No. 15/628,524, filed on Jun. 20, 2017, which is a continuation-in-part of application No. 15/195,379, filed on Jun. 28, 2016, now Pat. No. 9,717,008.

(51) Int. Cl.
   *H04B 17/14* (2015.01)
   *H04B 17/19* (2015.01)
   *H04B 17/13* (2015.01)
   *H04B 1/40* (2015.01)

(56) References Cited

U.S. PATENT DOCUMENTS

| | | | |
|---|---|---|---|
| 2015/0326326 A1* | 11/2015 | Nobbe | ............... H04B 17/12 375/224 |
| 2018/0131452 A1 | 5/2018 | Sharma et al. | |
| 2018/0131453 A1 | 5/2018 | Sharma et al. | |

OTHER PUBLICATIONS

Jackson, Blane, Notice of Allowance received from the USPTO dated Mar. 28, 2018 for U.S. Appl. No. 15/658,256, 18 pgs.
Jackson, Blane, Notice of Allowance received from the USPTO dated Jul. 23, 2018 for U.S. Appl. No. 15/628,524, 13 pgs.
Boetzel, Ulrich, International Preliminary Report on Patentability received from the EPO dated Jun. 28, 2018 for appln. No. PCT/US2017/039592, 28 pgs.

* cited by examiner

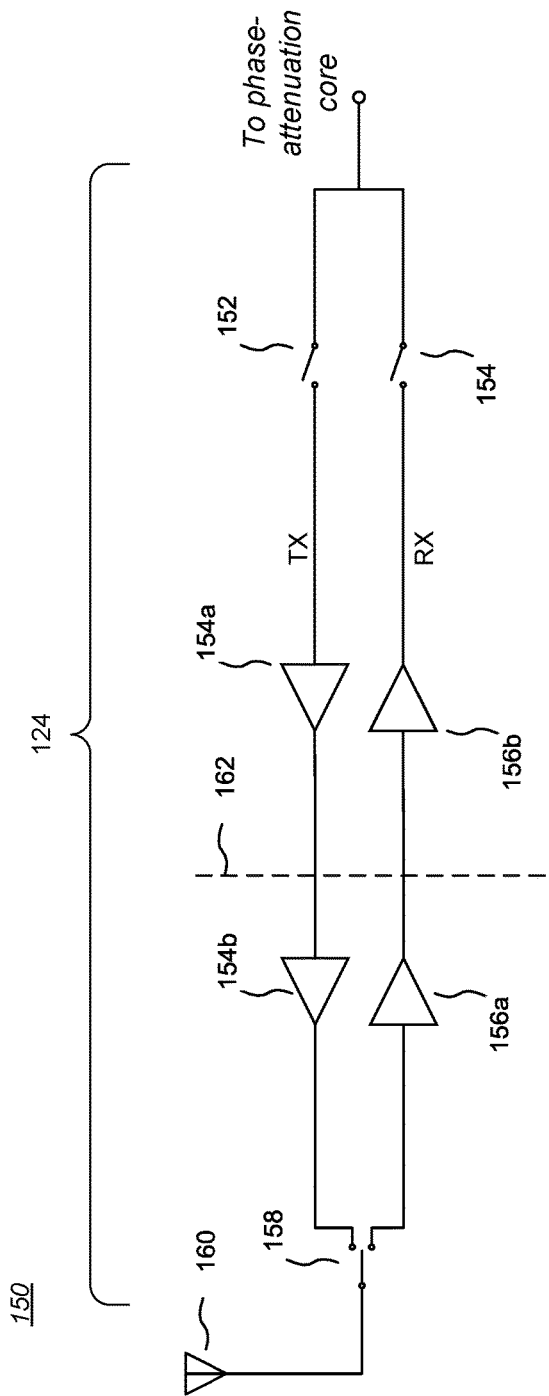
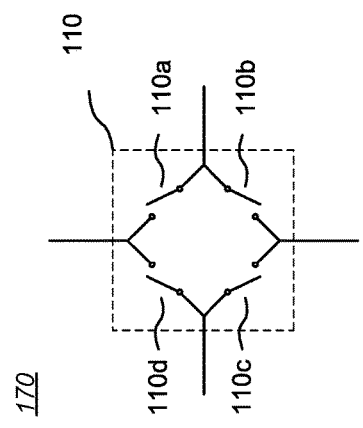
FIG. 1B
FIG. 1C

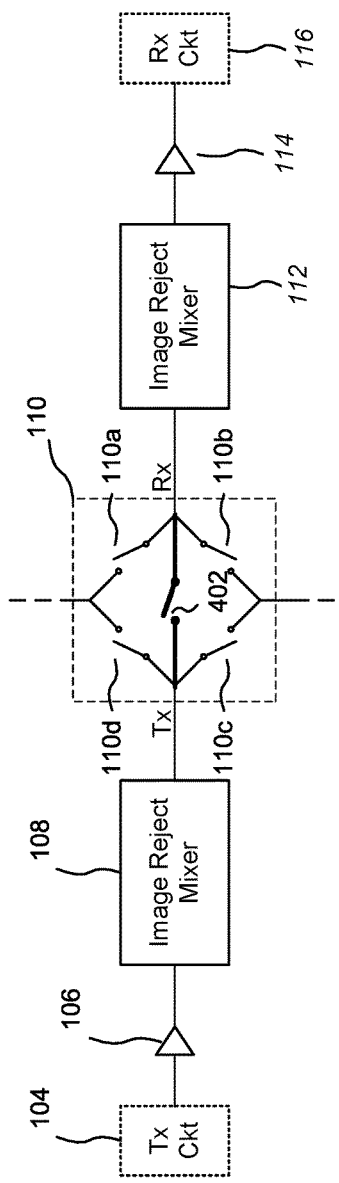
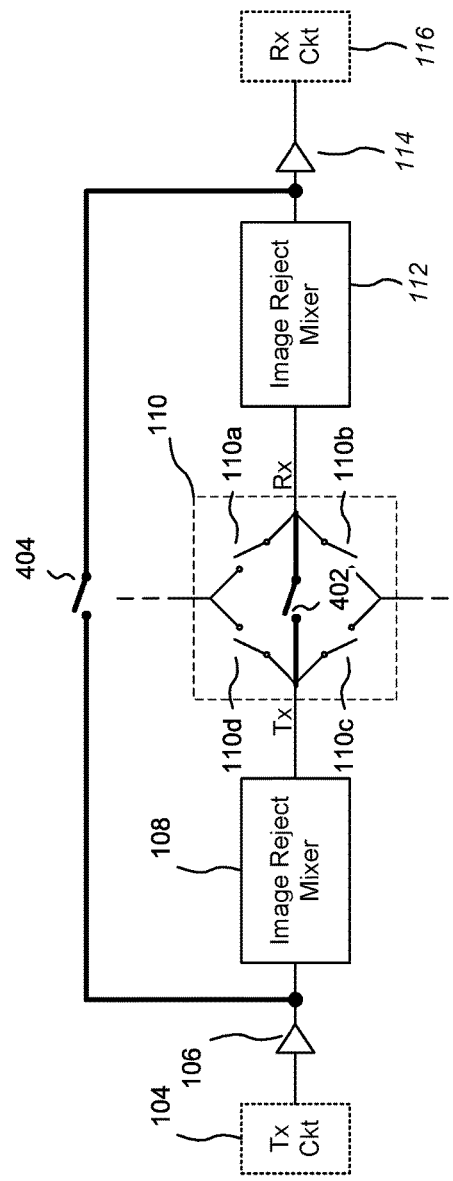

Antenna Mutual Coupling General Configuration

All channels receiving

All channels transmitting

Loop-back mode – Core 1 to Core 2

Loop-back mode – Core 3 to Core 4

INTEGRATED CIRCUIT CALIBRATION ARCHITECTURE

CROSS-REFERENCE TO RELATED APPLICATIONS—CLAIMS OF PRIORITY

This application is a continuation of and claims priority to commonly owned and co-pending U.S. patent application Ser. No. 15/658,256 filed Jul. 24, 2017, entitled "Integrated Circuit Calibration Architecture", which is a continuation-in-part of and claims priority to commonly owned and co-pending U.S. patent application Ser. No. 15/628,524, filed Jun. 20, 2017, entitled "Integrated Circuit Calibration Architecture", which is a continuation-in-part of and claims priority to commonly owned U.S. patent application Ser. No. 15/195,379, filed Jun. 28, 2016 (now U.S. Pat. No. 9,717,008, issued Jul. 25, 2017), entitled "Integrated Circuit Calibration Architecture", the disclosures of which are incorporated herein by reference in its entirety.

BACKGROUND

(1) Technical Field

This invention relates to electronic circuits, and more particularly to calibration and testing architectures for radio frequency integrated circuits.

(2) Background

Radio frequency (RF) integrated circuits (ICs) may include a number of different RF signal paths and involve multiple inputs and outputs, such as is the case with multi-antenna/multi-transceiver RF ICs. Such RF IC's may be used, for example, in communication or radar systems that utilize beamforming techniques for directional signal transmission and/or reception. Beamforming combines transmit/receive elements in a phased array in such a way that signals at particular angles experience constructive interference while other signals at other angles experience destructive interference. Beamforming can be used at both the transmitting and receiving ends of a communication system in order to achieve spatial selectivity. Another advantage of beamforming is that the directional nature of the link means that less power needs to be transmitted to achieve a good signal to noise ratio at the receiver because all of the signal energy is directed at the receiver rather than being dispersed omni-directionally.

The quality of beamforming depends on how accurately multiple transceivers on an IC track each other with respect to at least phase and signal amplitude. It is possible to adjust the settings of different transceiver phase shifters circuits and attenuators circuits (positive and negative) if the performance of each transceiver is known in advance. Measured differences between transmitted and received signals may be used to adjust (calibrate) the phase and/or signal amplitude state of one transceiver with respect to another transceiver. However, accurate calibration measurements of such performance are difficult to obtain in an assembled final system where all measurements need to be done "over the air", meaning actually transmitting a signal (which may be varied over a band of frequencies) from one transceiver through an antenna and receiving that signal in a different transceiver through an antenna. Such measurements require relatively elaborate testing equipment capable of dealing with high frequency RF signals (e.g., up to 30 GHz or more) and may be heavily influenced by environmental factors in the test set-up that alter, shield, attenuate, distort, or otherwise affect the transmitted and received signals. Furthermore, the accuracy or performance of a transceiver will vary over the possible bandwidth of the system, and therefore adjustments may need to be made dynamically depending on the instantaneous frequency of operation.

Accordingly, there is a need to be able to calibrate RF ICs used in transceiver RF systems more accurately, preferably with a simpler testing environment. The present invention meets this need and more.

SUMMARY OF THE INVENTION

The invention encompasses a calibration architecture that enables accurate calibration of radio frequency (RF) integrated circuits (ICs) chips used in transceiver RF systems in a relatively simple testing environment. Embodiments of the invention include one or more on-chip switchable internal calibration paths that enable direct coupling of a portion of the on-chip circuit to an RF test system while isolating other circuitry on the chip. Some embodiments allow interconnection of switchable internal calibration paths between separate IC chips. Still other embodiments utilize internal switches and antenna mutual coupling to provide over-the-air calibration, alone or in combination with direct signal coupling via internal calibration paths.

Advantages of various embodiments of the invention include a calibration architecture that enables accurate calibration of RF ICs used in transceiver RF systems in a relatively simple testing environment that is done by direct connection (as opposed to over-the-air) at significantly lower frequencies. Accordingly, environmental factors in the test set-up that alter, shield, attenuate, distort, or otherwise affect transmitted and received over-the-air test signals are eliminated or significantly mitigated by using such direct connections.

While direct connection via switchable internal calibration paths provides for accurate calibration of RF IC transceiver circuits, in some embodiments, internal switches and antenna mutual coupling enable over-the-air calibration, alone or in combination with direct signal coupling via internal calibration paths. Such embodiments thus allow even more complete calibration that takes into account the RF signal path from transceiver to transceiver through over-the-air test signals.

Periodic self-calibration of an RF IC in accordance with the present invention can be performed after initial factory calibration, so that adjustments in desired performance parameters can be made while such an IC is embedded within a final system, and thus take into account the actual usage environment (including, for example, temperature, electrically "noisy" circuitry, parasitic electromagnetic coupling, etc.). Periodic self-calibration also allows re-characterization of such an RF IC to take into account component degradation due to age or other factors.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 1B is a block diagram of the input/output circuit of FIG. 1A.

FIG. 1C is a block diagram of the multi-way switch complex of FIG. 1A.

FIG. 4A is a block diagram of a portion of the circuitry of FIG. 1A or FIG. 3 showing an indirect intermediate frequency path bypass switch FIG. 4B is a block diagram of a portion of the circuitry of FIG. 1A or FIG. 3 showing a direct IF bypass switch.

Like reference numbers and designations in the various drawings indicate like elements.

DETAILED DESCRIPTION OF THE INVENTION

The invention encompasses a calibration architecture that enables accurate calibration of radio frequency (RF) integrated circuits (ICs) chips used in transceiver RF systems in a relatively simple testing environment. Embodiments of the invention include one or more on-chip switchable internal calibration paths that enable direct coupling of a portion of the on-chip circuit to an RF test system while isolating other circuitry on the chip.

Basic Core Circuit Testing Configuration

Figure 1A:
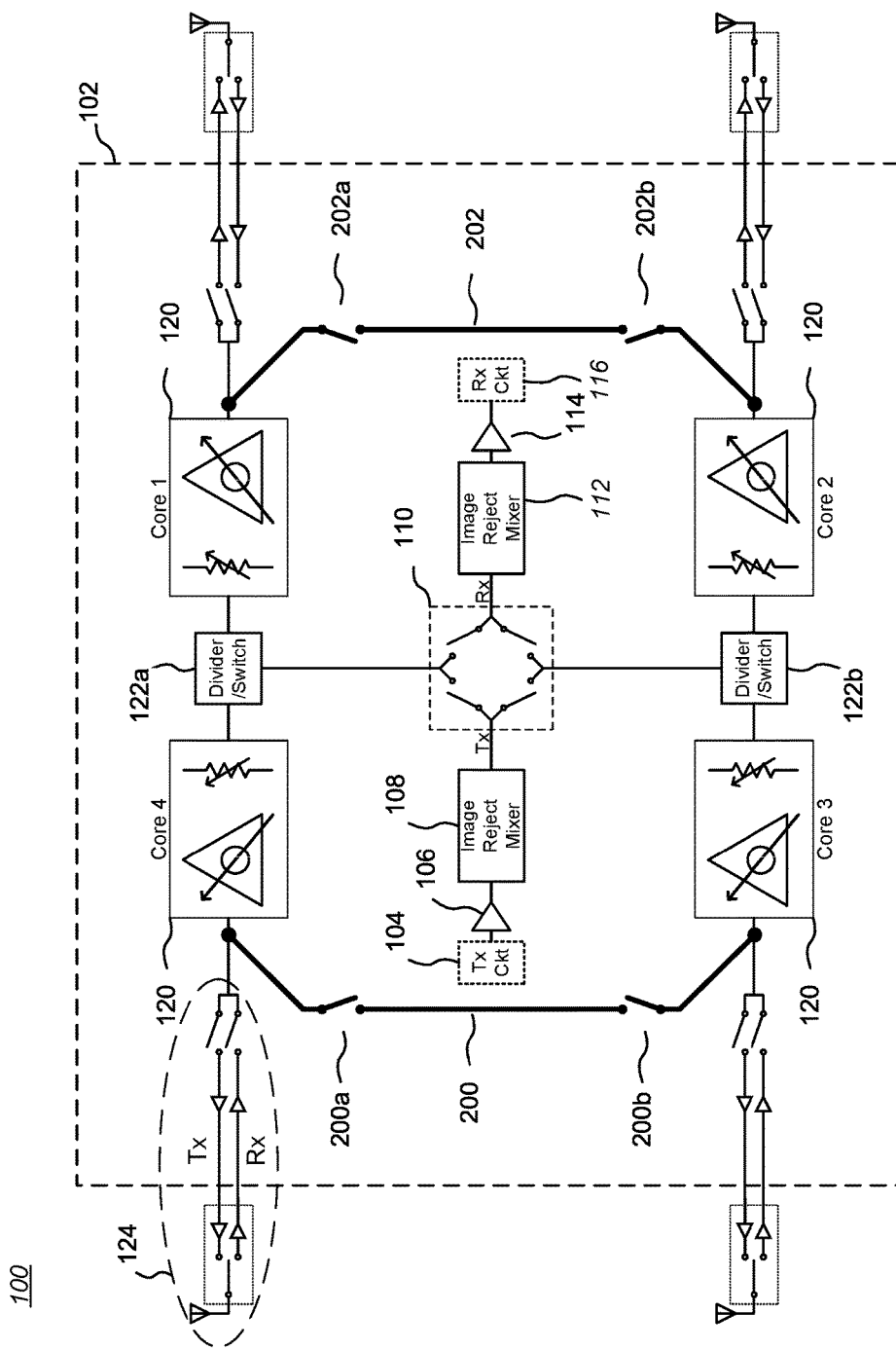
FIG. 1A is a block diagram of a first embodiment of an RF IC (or "chip") with integrated calibration circuitry suitable for use in a transceiver RF system.

FIG. 1A is a block diagram 100 of a first embodiment of an RF IC 102 (or "chip") with integrated calibration circuitry suitable for use in a transceiver RF system. This particular example of an RF IC 102 is configured to be coupled to transmit circuitry 104 (labeled "Tx Ckt") through an isolation and/or drive buffer 106 to a conventional image reject mixer 108, which in turn is coupled to a multi-way switch complex 110 (see also FIG. 1C). Also coupled to the multi-way switch complex 110 through a conventional image reject mixer 112 and an isolation and/or drive buffer 114 is receive circuitry 116 (labeled "Rx Ckt"). In alternative embodiments, conventional mixers may be used in place of the image reject mixers 108, 112. The transmit circuitry 104 and the receive circuitry 116 generally will operate at baseband frequencies, but some embodiments may operate at intermediate (IF) or RF frequencies (with appropriate adjustments in other circuitry, such as the image reject mixers 108, 112, if needed; more specifically, if the transmit circuitry 104 and the receive circuitry 116 operate at RF frequencies, then the image reject mixers 108, 112 may be omitted).

The transmit circuitry 104 and/or the receive circuitry 116 may be on-chip, or optionally may be on off-chip, as suggested by the dotted boxes around both circuit blocks. In some embodiments, one or both buffers 106, 114 and one or both image reject mixers 108, 112 may be external to the RF IC 102. Accordingly, in some configurations of the RF IC 102, the transmit circuitry 104, drive buffer 106, and image reject mixer 108 can be considered to define a primary RF transmission path Tx, while in other configurations, the drive buffer 106 and image reject mixer 108 can be considered to define the primary RF transmission path Tx, and in yet other configurations, the input to the multi-way switch complex 110 can be considered to define the primary RF transmission path Tx. Similarly, in some configurations of the RF IC 102, the image reject mixer 112, buffer 114, and receive circuitry 116 can be considered to define a primary RF reception path Rx, while in other configurations, the image reject mixer 112 and buffer 114 can be considered to define the primary RF reception path Rx, and in yet other configurations, the output of the multi-way switch complex 110 can be considered to define the primary RF reception path Rx.

In the illustrated example, the multi-way switch complex 110 allows selective coupling of either the transmit circuitry 104 or the receive circuitry 116 to one or more phase-attenuation cores 120 through a corresponding divider/switch 122a, 122b (see also FIG. 1C for more details of the multi-way switch complex 110). A divider/switch 122a, 122b, may be, for example, a Wilkinson power divider (which optionally may be bypassable through a parallel switch path), or a set of switches for directing transmitted or received signals between the multi-way switch complex 110 and one or more of the phase-attenuation cores 120. If needed for impedance matching, the multi-way switch complex 110 may be coupled to the divider/switches 122a, 122b through a transmission line (not shown).

The four illustrated phase-attenuation cores 120 may include a phase shifter circuit and a signal amplitude control circuit, such as an attenuator circuit that provides a reduction in amplitude of an applied signal, or an amplifier that amplifies an applied signal and thus effectively provides "negative attenuation" (e.g., a variable gain amplifier); one or both of the phase shifter circuit and/or signal amplitude control circuit may be adjustable or variable. More than or fewer than four phase-attenuation cores 120 may be included on the RF IC 102; in general, the number of phase-attenuation cores 120 may range from 1 to N, where N is limited only by practical IC fabrication constraints. Each phase-attenuation core 120 is shown connected to an associated input/output circuit 124 (to avoid clutter, only one input/output circuit 124—indicated by a dashed-line oval—is numbered). In some embodiments, the combination of a phase-attenuation core 120 and an associated input/output circuit 124 comprises a transceiver front-end circuit, while in other embodiments, a phase-attenuation core 120 alone comprises a transceiver front-end circuit (e.g., where the phase-attenuation cores 120 of an RF IC 102 are configured to be coupled to corresponding external input/output circuits 124).

FIG. 1B is a block diagram 150 of the input/output circuit 124 of FIG. 1A. In the illustrated example, a pair of single-pole, single-throw (SPST) switches 152, 154 may respectively select a transmit path TX or a receive path RX. The SPST switches 152, 154 may be implemented, for example, as one or more field effect transistors (FETs), or may be microelectromechanical system (MEMS) devices, and are preferably included on-chip. Further, in some embodiments, a single-pole, double-throw (SPDT) switch may be used in place of the SPST switches 152, 154, and in many cases would be preferred.

The transmit path TX includes one or more amplifiers 154a, 154b, which may be on-chip, off-chip, or a mix of on-chip and off-chip (FIG. 1A shows such a mix). One or more of the transmit path TX amplifiers (e.g., amplifier 154a) may be an isolation and/or drive buffer amplifier (which may only have unity gain in some cases). At least one of the amplifiers 154a, 154b may be a power amplifier.

The receive path RX also includes one or more amplifiers 156a, 156b, which may be on-chip, off-chip, or a mix of on-chip and off-chip (again, FIG. 1A shows such a mix). One or more of the receive path RX amplifiers (e.g., amplifier 156b) may be an isolation and/or drive buffer amplifier (again, which may only have unity gain in some cases). At least one of the amplifiers 156a, 156b may be a low noise amplifier (LNA).

A single-pole, double-throw (SPDT) switch 158 selectively couples either the transmit path TX or the receive path RX to an antenna 160. The SPDT switch 158 may be implemented, for example, as one or more FETs or MEMS devices. In some embodiments, a pair of SPST switches (similar to SPST switches 152, 154) may be used in place of the SPDT switch 158.

In a typical configuration, as suggested by the dotted line 162, amplifier 154a is an on-chip buffer amplifier, amplifier 154b is an off-chip power amplifier, SPDT switch 158 is off-chip, amplifier 156a is an off-chip LNA, and amplifier 156b is an on-chip buffer amplifier (i.e., the gain may be 1). The state of the various switches 152, 154, 158 may be controlled by on-chip or off-chip control circuitry (not shown).

While some components shown in FIGS. 1A and 1B are illustrated as being external to the RF IC 102, in some embodiments, all of the elements shown as external to the RF IC 102 or optionally external to the RF IC 102 may be fully integrated onto a single IC die or onto a set of intercoupled IC dies placed inside or embedded within a single IC package. A fully integrated version is to a great extent desirable, since all circuitry on the same die would have similar gradients for process, voltage, and temperature (PVT) variations, and hence a calibration scheme would be simplified.

FIG. 1C is a block diagram 170 of the multi-way switch complex 110 of FIG. 1A, showing individually labeled switches 110a-110d, which may be implemented, for example, as one or more FETs or MEMS devices. A divider/switch 122a, 122b implemented as a set of switches may use a "half" version of the multi-way switch complex 110—for example, only switches 110b and 110c. Optionally, a set of switchable impedance matching elements may be included to accommodate the different number of paths enabled (e.g., switches 110b and 110c both closed, switches 110b and 110c both open, or only one of switches 110b and 110c being closed with the other being open), and thus resulting impedance perturbations. An example of such switchable impedance matching elements is described below in conjunction with FIG. 3.

Referring back to FIG. 1A, by selectively controlling the multi-way switch complex 110 and the switches of one or more input/output circuits 124, a signal originating in the transmit circuitry 104 can be transmitted as an RF signal through one or more phase-attenuation cores 120 to one or more antennas 160 while isolating the receive circuitry 116. Similarly, an RF signal received at one or more antennas 160 can be conveyed through one or more phase-attenuation cores 120 to the receive circuitry 116 while isolating the transmit circuitry 104. In either case, the phase and/or amplitude of the RF signal may be modified by one or more of the phase-attenuation cores 120. It should be understood that FIG. 1A is simply one example of a transceiver RF system, and that other configurations of transceiver RF systems are within the scope of the invention as claimed below.

Referring back to FIG. 1A, in order to enable calibration of at least the phase-attenuation cores 120 of the illustrated RF IC 102, a set of internal switchable cross-circuit calibration ("C3") paths 200, 202 are formed on-chip and connected between pairs of phase-attenuation cores 120. As illustrated, C3 path 200 connects corresponding ports of Core 3 and Core 4, and C3 path 202 connects corresponding ports of Core 1 and Core 2.

In the illustrated embodiment, C3 path 200 includes two associated switches 200a, 200b, and similarly C3 path 202 includes two associated switches 202a, 202b. Such a configuration is useful in conjunction with the embodiment shown in FIG. 3 described below, but only one switch per C3 path need be used if on-chip calibration is limited to the phase-attenuation cores 120. The associated C3 path switches may be implemented, for example, as one or more FETs or MEMS devices.

Figure 2:
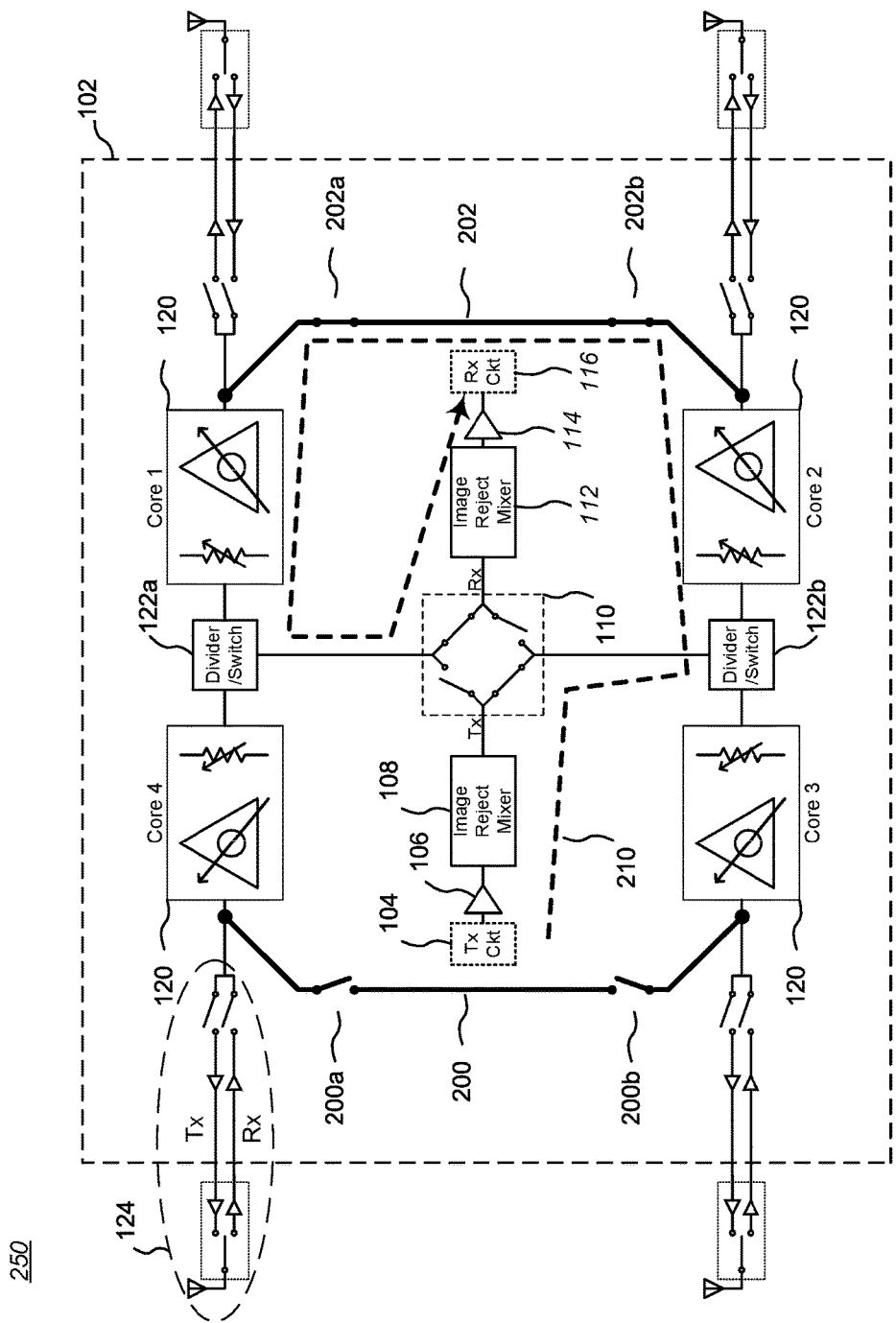
FIG. 2 is a block diagram showing a switch configuration for testing phase-attenuation Cores 1 and 2 of the RF IC of FIG. 1A.

FIG. 2 is a block diagram 250 showing a switch configuration for testing phase-attenuation Cores 1 and 2 of the RF IC of FIG. 1A. As illustrated, two of the switches (110a, 110c in FIG. 1C) of the multi-way switch complex 110 and the associated switches 202a, 202b of the C3 path 202 are closed, thus creating a signal path as indicated by the bold dashed line—that is, from the transmit circuitry 104 through the buffer 106, image reject mixer 108, one signal path of the multi-way switch complex 110, divider/switch 122b, Core 2, C3 path 202, Core 1, divider/switch 122a, back through a different signal path of the multi-way switch complex 110, and thence through image reject mixer 112 and buffer 116 to receive circuitry 116. All other illustrated switches are open. Thus, an RF signal from the transmit circuitry 104 can be conveyed internally through both Core 2 and Core 1 of the RF IC 102 to the receive circuitry 116.

In a preferred embodiment, to calibrate Core 1, applied control signals set Core 2 to have minimum amplitude adjustment and approximately zero phase shift to minimize any effect of Core 2 on an RF test signal (which may be just a normal RF transmission signal). At the same time, applied control signals set Core 3 and Core 4 to have a maximum attenuation (high impedance), primarily to provide a good 50 ohm impedance for the divider/switches 122a, 122b, and secondarily to reduce the impact of Core 3 and Core 4 on any measurements that may occur through RF coupling. While an RF test signal (which may be varied over a desired frequency range) is applied by the transmit circuitry 104 and/or by external test equipment, applied control signals "sweep" (vary) the attenuation and/or phase state settings of Core 1 over a range of possible nominal settings at each applied RF signal frequency. The actual effects on the internally conveyed RF signal of each nominal phase shift and attenuation state setting can be measured within the receive circuitry 116 and/or by external test equipment.

Similarly, in a preferred embodiment, to calibrate Core 2, applied control signals set Core 1 to have minimum amplitude adjustment and approximately zero phase shift, applied control signals optionally set Core 3 and Core 4 to have a maximum attenuation, and an RF test signal (which may be varied over a desired frequency range) is applied by the transmit circuitry 104 and/or by external test equipment. Applied control signals sweep the attenuation and/or phase state settings of Core 2 over a range of possible settings at each applied RF signal frequency. The resulting effects on the internally conveyed RF signal can be measured within the receive circuitry 116 and/or by external test equipment.

In both cases, the RF signal path is along the counter-clockwise bold dashed line 210 when characterizing the signal modification behavior of Core 2 or Core 1. Note that a "clockwise" version of the RF signal path that traverses through Core 1 first and Core 2 second can be achieved by reversing the illustrated switch states of the component switches of the multi-way switch complex 110. If desired, both the clockwise and counter-clockwise versions of the RF signal path may be characterized; this may be advantageous if the Core blocks and/or signal paths are asymmetric. For example, Core 1 may have more amplitude control variation and phase shift range than Core 2, or the RF IC 102 may contain an odd number of Cores (e.g., 3, 5, or 7).

In a similar manner, Cores 3 and 4 can be characterized by closing the other two switches (110b, 110d in FIG. 1C) of the multi-way switch complex 110, closing the associated switches 200a, 200b of the C3 path 200, and opening all other illustrated switches, thus allowing an RF signal to be conveyed from the transmit circuitry 104 internally through Core 4 and then Core 3 of the RF IC 102 to the receive circuitry 116 (i.e., counter-clockwise). Alternatively, an RF signal can be conveyed clockwise from the transmit circuitry 104 internally through Core 3 and then Core 4 to the receive circuitry 116 by closing the associated switches 200a, 200b of the C3 path 200, but keeping the switch configuration of the multi-way switch complex 110 as shown in FIG. 2 and opening all other illustrated switches.

In tabular form, referring to the illustrated switches, an RF test signal based on a signal originating from the transmit circuitry 104 can be transmitted through any of the phase-attenuation cores 120 (Cores 1-4 in this case) to the receive circuitry 116 by opening (binary 0) or closing (binary 1) the switches as shown in TABLE 1:

TABLE 1

| | CORES TO TEST (order indicates direction of test signal) | | | |
|---|---|---|---|---|
| SWITCH | Core 2 Core 1 | Core 1 Core 2 | Core 3 Core 4 | Core 4 Core 3 |
| 110a | 1 | 0 | 1 | 0 |
| 110b | 0 | 1 | 0 | 1 |
| 110c | 1 | 0 | 1 | 0 |
| 110d | 0 | 1 | 0 | 1 |
| 200a | 0 | 0 | 1 | 1 |
| 200b | 0 | 0 | 1 | 1 |
| 202a | 1 | 1 | 0 | 0 |
| 202b | 1 | 1 | 0 | 0 |

Other calibration schemes may be used as well. For example, the testing scheme illustrated in FIG. 2 connects Cores 1 and 2 in series while essentially isolating Cores 3 and 4. In alternative testing schemes, it may be useful to serially connect more than two Cores, or to serially connect two or more Cores in sets while concurrently connecting two or more of such sets in parallel (some additional path switches may need to be added in some cases). For example, referring to FIG. 2, switches 200a, 200b of the C3 path 200 may be closed along with switches 202a, 202b of the C3 path 202, thus creating a first signal path from the transmit circuitry 104 through Cores 2 and 1 to the receive circuitry 116, and a parallel second signal path from the transmit circuitry 104 through Cores 3 and 4 to the receive circuitry 116. Such a parallel configuration allows characterization of the interaction of Cores 1 and 4 over their respective ranges of attenuation and phase shift while Cores 2 and 3 are set to minimum amplitude adjustment and approximately zero phase shift. Similarly, the interaction of Cores 2 and 3 can be characterized over their respective ranges of attenuation and phase shift while Cores 1 and 4 are set to minimum amplitude adjustment and approximately zero phase shift. In each case, the phase and/or attenuation settings for Cores being characterized may be varied in parallel across all such Cores, or one Core may be varied while one or more other Cores are in a set phase/attenuation condition. Such testing of parallel sets of series connected Cores may provide insight into the beam forming and path tapering characteristics of a particular transceiver RF system embodied in or incorporating an RF IC 102.

Characterization of the phase-attenuation cores 120 (e.g., Cores 1-4) by mapping nominal phase and amplitude control states to actual phase shift and amplitude (attenuation or amplification) levels may be sufficient for some calibration purposes. For example, a nominal attenuation level for Core 1 of 1.5 dB may result in a measured attenuation level of 1.4 dB. In some applications, simply knowing such discrepancies may by sufficient. In other cases, some designs for the phase-attenuation cores 120 provide for internal compensation of such discrepancies, such as by storing such mappings in a look-up table, so that the actual phase shift and attenuation/amplification levels more closely correspond to the nominal phase and attenuation/amplification states. Examples of a phase shifter circuit having extra circuitry for enabling such compensation capabilities may be found in U.S. patent application Ser. No. 14/988,463, filed Jan. 5, 2016, entitled Reflection-Based RF Phase Shifter and assigned to the assignee of the present invention, the teachings of which are hereby incorporated by reference. Similar considerations apply to adding and utilizing extra attenuation or amplifier elements for compensation purposes within the attenuator portion of a phase-attenuation core 120. In all cases, it is useful to characterize all of the phase-attenuation cores 120 (Cores 1-4 in the example of FIG. 2) to take into account possible variations between such cores, for example, due to process variations and differences in adjacent circuitry.

Core Circuit+Input/Output Circuit Testing Configuration

Figure 3:
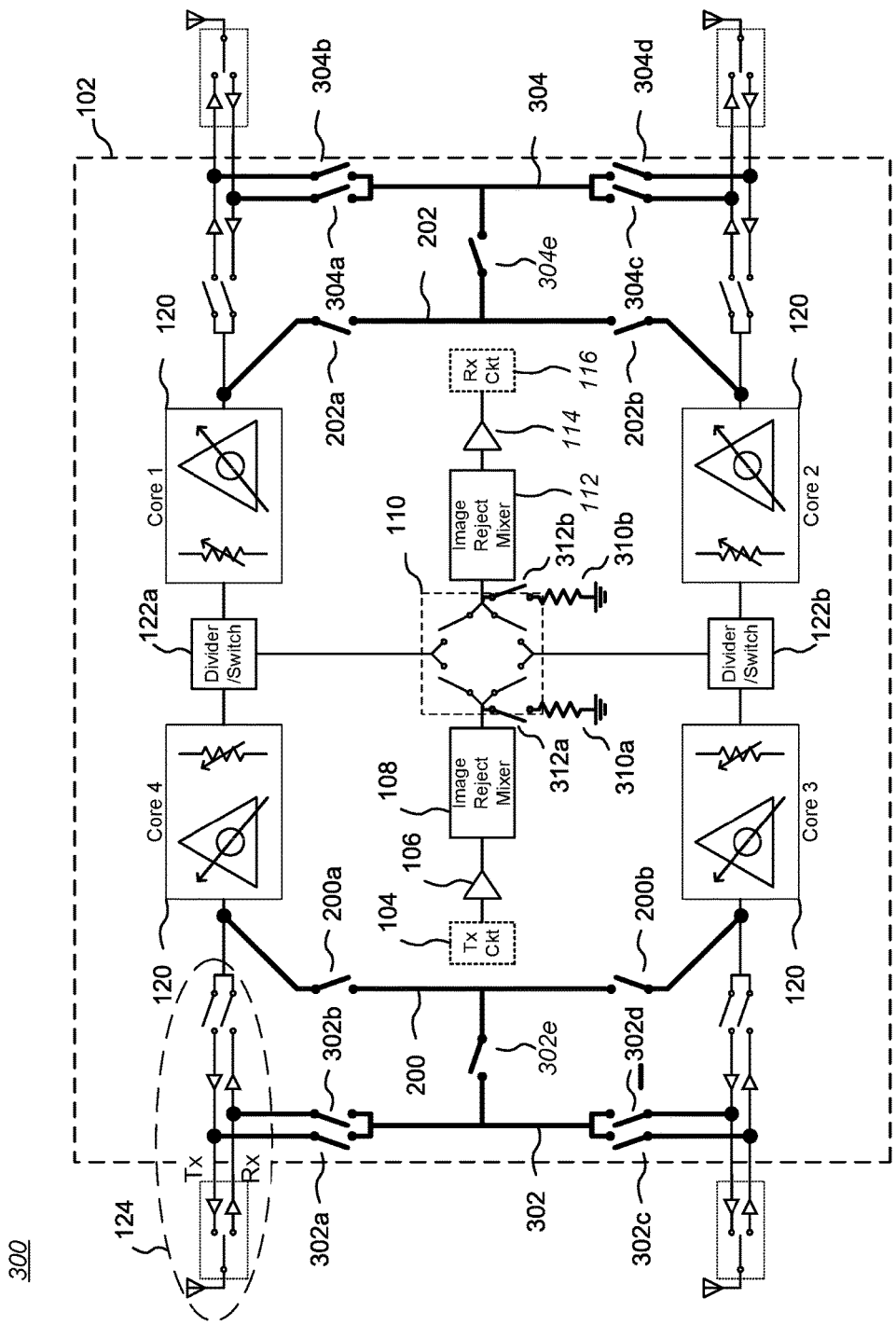
FIG. 3 is a block diagram of a second embodiment of an RF IC with integrated calibration circuitry suitable for use in a transceiver RF system.

The concepts described above can be extended to include more circuitry that may affect an RF signal conveyed to or from the antennas 160. Thus, while the embodiment of FIG. 1A and FIG. 2 allows for characterization of the phase-attenuation cores 120, it is possible to extend testing to more peripheral circuitry in the RF IC 102, such as the on-chip amplifiers 154a, 156b (see FIG. 1B) in each associated input/output circuit 124. For example, FIG. 3 is a block diagram of a second embodiment of an RF IC with integrated calibration circuitry suitable for use in a transceiver RF system. Formed on-chip with the circuit of FIG. 1A are sets of internal switchable periphery cross-circuit calibration ("PC3") paths 302, 304, each connected to the transmit path TX and the receive path RX of pairs of phase-attenuation cores 120 by associated switches 302a-302d, 304a-304d. (Note that the PC3 paths are essentially the same as C3 paths, differing only in the connection points and number of switches, and are re-named only for clarity in the following description.)

As illustrated, PC3 path 302 connects corresponding TX and RX paths of Core 3 and Core 4, and PC3 path 304 connects corresponding TX and RX paths of Core 1 and Core 2, at a point "between" corresponding on-chip amplifiers 154a, 156b (see FIG. 1B) and external circuit connections for the RF IC 102. Each PC3 path 302, 304 is also coupled by an associated link switch 302e, 304e to a corresponding C3 path 200, 202. The associated PC3 path and link switches may be implemented, for example, as one or more FETs or MEMS devices.

By setting the states of the multi-way switch complex 110, the switches of an associated input/output circuit 124, the switches 302a-302e, 304a-304e associated with the PC3 paths 302, 304, and the switches 200a-200b, 202a-202b of the C3 paths 200, 202, an RF test signal from the transmit circuitry 104 can be transmitted through any of the phase-attenuation cores 120 (Cores 1-4 in this case), through either an associated output amplifier 154a or input amplifier 156b, and then to the receive circuitry 116. Accordingly, the characteristics of any one amplifier 154a, 156b in the chain of components can be determined.

For example, referring to FIG. 3, the influence of the output amplifier 154a for Core 2 can be characterized by closing switch 110c (see FIG. 1C), SPST switch 152 (see FIG. 1B), switch 304c, link switch 304e, switch 202a, and switch 110a, while opening all other illustrated switches. Similarly, the influence of the input amplifier 156b for Core 1 can be characterized by closing switch 110c, switch 202b, link switch 304e, switch 304a, SPST switch 154, and switch 110a, while opening all other illustrated switches.

Focusing on just Cores 1 and 2, at least the peripheral component test signal pathways shown in TABLE 2 can be achieved by opening (binary 0) or closing (binary 1) the specified switches (note that these are in addition to the available test pathways shown in TABLE 1). All other illustrated switches not shown in TABLE 2 should be open. A similar set of switch settings will apply to Cores 3 and 4, or to any other number of phase-attenuation cores 120.

TABLE 2

| | SIGNAL PATHS TO TEST | | | |
|---|---|---|---|---|
| SWITCH | Core 1 TX amp | Core 1 RX amp | Core 2 TX amp | Core 2 RX amp |
| 110a | 0 | 1 | 1 | 0 |
| 110b | 1 | 0 | 0 | 1 |
| 110c | 0 | 1 | 1 | 0 |
| 110d | 1 | 0 | 0 | 1 |
| 202a | 0 | 0 | 1 | 1 |
| 202b | 1 | 1 | 0 | 0 |
| 304a | 0 | 1 | 0 | 0 |
| 304b | 1 | 0 | 0 | 0 |
| 304c | 0 | 0 | 1 | 0 |
| 304d | 0 | 0 | 0 | 1 |
| 304e | 1 | 1 | 1 | 1 |
| Core 1 TX: 152 | 1 | 0 | 0 | 0 |
| Core 1 RX: 154 | 0 | 1 | 0 | 0 |
| Core 2 TX: 152 | 0 | 0 | 1 | 0 |
| Core 2 RX: 154 | 0 | 0 | 0 | 1 |

As in the case of characterizing the phase-attenuation cores 120, mapping nominal phase and amplitude control states to actual phase shift and attenuation/amplification levels for each phase-attenuation core 120 as influenced by the associated amplifiers 154a, 154b may be sufficient for some calibration purposes. In other cases, some designs for the phase-attenuation cores 120 provide for internal compensation of such discrepancies, so that the actual phase shift and attenuation/amplification levels can be set to more closely correspond to the nominal phase and attenuation/amplification states.

In some testing configurations, impedance mismatches may occur due to asymmetric loading of the divider/switches 122a, 122b as an RF test signal is routed to only one set of cores (e.g., Core 1 and Core 2) while other sets of cores (e.g., Core 3 and Core 4) are set to be in an essentially disconnected or isolated state. To counteract such mismatches, offsetting impedances 310a, 310b (shown as absorptive shunt resistors, by way of example) optionally may be coupled by associated switches 312a, 312b to the switch complex 110 at the ports coupled to the image reject mixers 108, 110. While only two such offsetting impedances 310a, 310b are shown (on the "bottom" side of the switch complex 110), for layout symmetry, it may be desirable to provide similar switched impedances on the "top" side of the switch complex 110. The associated switches may be implemented, for example, as one or more FETs or MEMS devices.

For an RF IC 102 for circuitry having a characteristic impedance of 50 ohms, the offsetting impedances 310a, 310b may be about 100 ohms each. In operation, when a calibration mode RF test path is created within the RF IC 102 through the C3 paths 200, 202 and/or the PC3 paths 302, 304, the switches 312a, 312b associated with the offsetting impedances 310a, 310b would be closed. In a normal, non-calibration operational mode, the switches 312a, 312b associated with the offsetting impedances 310a, 310b would be open.

Similarly, a set of switchable impedance matching elements may be included in the divider/switches 122a, 122b themselves to accommodate the different number of paths enabled, and thus resulting impedance perturbations.

Internal Circuit Testing Configuration

Another optional circuit that may be included in embodiments of the invention is a switch that allows connection of the intermediate frequency (IF) portion of the end-to-end transmit circuitry 104 signal path to the IF portion of the receive circuitry 116, either directly or indirectly (i.e., with intermediate RF up-mixing and down-mixing). The IF portion of the end-to-end signal path is typically at a significantly lower frequency than the over-the-air transmitted and received signals for such a system. For example, while the over-the-air frequency may be around 30 GHz, the corresponding IF frequency may be about 3-4 GHz. Testing at IF frequencies has an advantage because less expensive testing equipment is required and influences by the testing environment (e.g., parasitic coupling) are lessened.

FIG. 4A is a block diagram of a portion of the circuitry of FIG. 1A or FIG. 3 showing an indirect intermediate frequency path bypass switch 402. As illustrated, the indirect IF bypass switch 402 is coupled between the transmitter image reject mixer 108 (which up-converts IF signals to RF signals) and the receiver image reject mixer 110 (which down-converts RF signals to IF signals). The indirect IF bypass switch 402 may be implemented, for example, as one or more FETs or MEMS devices. In operation, by closing the indirect IF bypass switch 402 while setting all of the switches 110a-110d of the switch complex 110 open, the transmit circuitry 104 is coupled to the receive circuitry 116 through the image reject mixers 108, 110. Such a test configuration allows characterization of the end-to-end circuit path from the transmit circuitry 104 to the receive circuitry 116 with a minimum of influence from other circuitry on the RF IC 102 (e.g., the divider/switches 122a, 122b and the Cores 1-4).

FIG. 4B is a block diagram of a portion of the circuitry of FIG. 1A or FIG. 3 showing a direct IF bypass switch 404. As illustrated, the direct IF bypass switch 404 is coupled between the transmit signal path buffer 106 and the receive signal path buffer 114 (but may be coupled to any part of the respective IF signal paths). The direct IF bypass switch 404 may be implemented, for example, as one or more FETs or MEMS devices. In operation, by closing the direct IF bypass switch 404 while setting all of the switches 110a-110d of the switch complex 110 open, an IF signal from the transmit circuitry 104 is directly coupled to the IF signal path of the receive circuitry 116. Such a test configuration allows characterization of the end-to-end circuit path from the transmit circuitry 104 to the receive circuitry 116 with a minimum of influence from other circuitry on the RF IC 102, including influences from the image reject mixers 108, 112.

As shown in FIG. 4B, both an indirect IF bypass switch 402 and a direct IF bypass switch 404 may be included on an RF IC 102 to allow characterization of the end-to-end circuit path from the transmit circuitry 104 to the receive circuitry 116 with or without the image reject mixers 108, 112 in the circuit path.

Using an indirect IF bypass switch 402 and/or a direct IF bypass switch 404 to characterize all or part of the end-to-end signal circuit path alone may be useful to "de-embed" the IF path characteristics from the actual RF measurements that are needed for calibration of the Cores (i.e., essentially allowing the effects of the IF components determined during a first calibration mode pass to be subtracted from the RF measurements through at least one Core during a second calibration mode pass). This may be particularly important for frequency variation across the RF bandwidth of interest because such variation is a much larger proportion of the total bandwidth at the lower IF frequency than it is at the higher RF frequency—for example, a frequency sweep of 2 GHz centered at an IF frequency of 4 GHz will show much more performance variation than a frequency sweep of 2 GHz centered at an RF frequency of 28 GHz.

As noted above, more than or fewer than four transceiver front-end circuits (i.e., phase-attenuation cores 120, optionally with associated input/output circuits 124) may be included on the RF IC 102. For two or four transceiver front-end circuits, the switchable cross-circuit calibration paths and switchable periphery cross-circuit calibration paths can be configured as shown in FIG. 1A and/or FIG. 3. For more than four transceiver front-end circuits on an RF IC 102, the switchable cross-circuit calibration paths, switchable periphery cross-circuit calibration paths, and various switch states can be configured in a variety of ways so long as each element of the transceiver front-end circuits to be tested (e.g., phase-attenuation cores 120 and/or on-chip amplifiers 154a, 156b) can be coupled to an RF test signal and measurement circuitry or devices in relative isolation from other elements of the RF IC 102.

Single Core Circuit Testing Configuration

Figure 5:
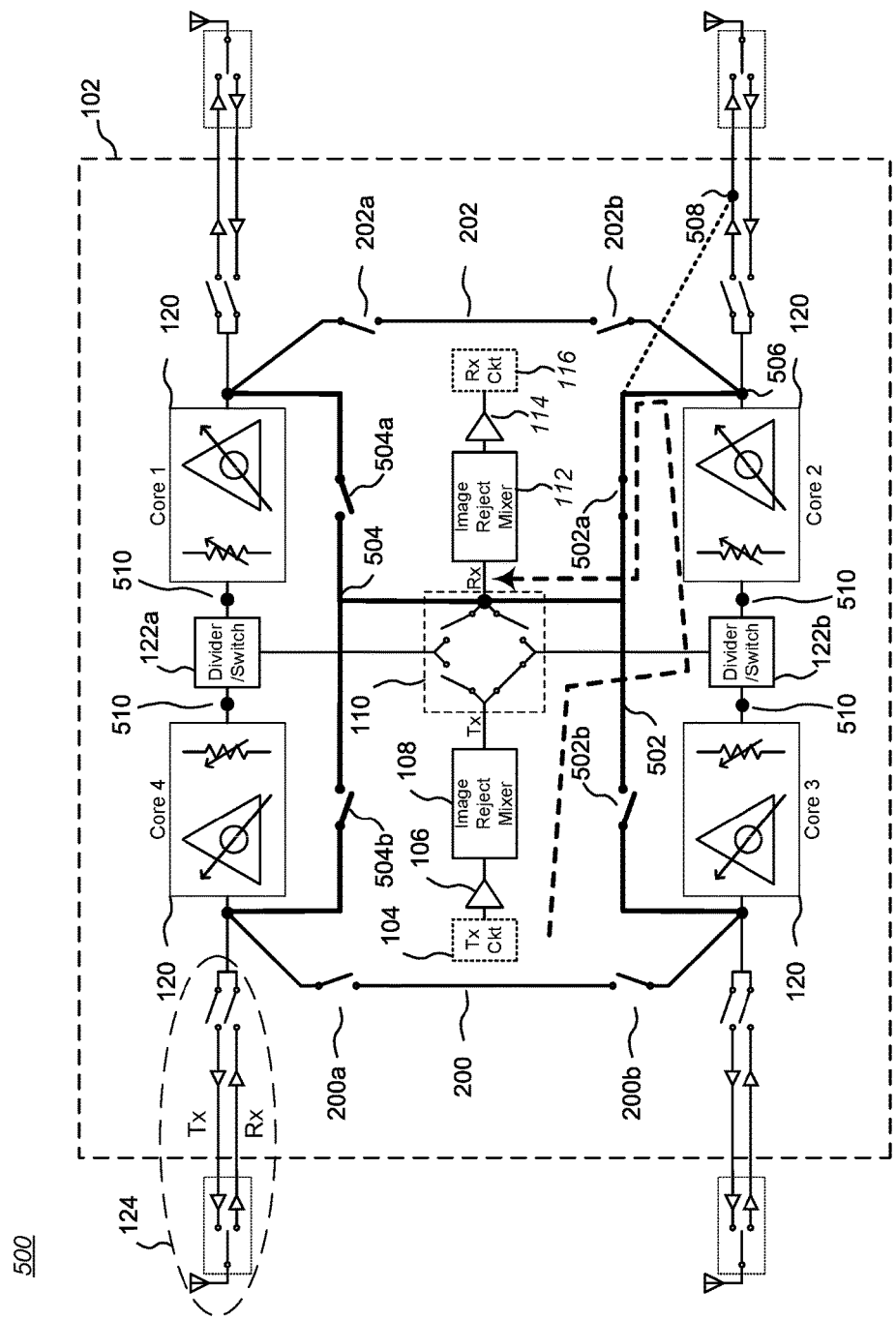
FIG. 5 is a block diagram of a third embodiment of an RF IC with integrated calibration circuitry suitable for use in a transceiver RF system.

The concepts described above can be extended to include less circuitry that may affect an RF signal conveyed to or from the antennas 160. For example, FIG. 5 is a block diagram of a third embodiment of an RF IC with integrated calibration circuitry suitable for use in a transceiver RF system. Formed on-chip with the circuit of FIG. 1A are sets of internal switchable bypass circuit calibration ("BC2") paths 502, 504, each connected to the reception path Rx by associated switches 502a-502b, 504a-504b. (Note that the BC2 paths are essentially the same as C3 or PC3 paths, differing only in the connection points and number of switches, and are re-named only for clarity in the following description.)

As illustrated, BC2 path 502 connects to Core 2 through switch 502a, and to Core 3 through switch 502b. Similarly, BC2 path 504 connects to Core 1 through switch 504a, and to Core 4 through switch 504b. The associated BC2 path switches may be implemented, for example, as one or more FETs or MEMS devices.

By setting the states of the multi-way switch complex 110 and the switches 502a-502b, 504a-504b associated with the BC2 paths 502, 504, an RF test signal from the transmit circuitry 104 can be transmitted through one of the phase-attenuation cores 120 (Cores 1-4 in this case) back to the receive circuitry 116 without the signal traversing any other phase-attenuation core 120. Accordingly, the characteristics of one phase-attenuation core 120 can be measured without the direct influence of any other phase-attenuation core 120 (ignoring possible parasitic couplings from nearby placement on the RF IC 102 of such other cores).

For example, referring to FIG. 5, Core 2 can be characterized by closing switch 110c (see FIG. 1C) and switch 502a while opening all other illustrated switches, thus creating a signal path as indicated by the bold dashed line—that is, from the transmit circuitry 104 through the buffer 106, image reject mixer 108, one signal path of the multi-way switch complex 110, divider/switch 122b, Core 2, switch 502a, BC2 path 502, and thence through image reject mixer 112 and buffer 116 to receive circuitry 116. Thus, an RF signal from the transmit circuitry 104 can be conveyed internally through only Core 2 of the RF IC 102 to the receive circuitry 116. Similarly, Core 3 alone can be characterized by closing switch 110c and switch 502b while opening all other illustrated switches, Core 1 alone can be characterized by closing switch 110d and switch 504a while opening all other illustrated switches, and Core 4 alone can be characterized by closing switch 110d and switch 504b while opening all other illustrated switches.

As illustrated, BC2 path 502 connects to Core 2 through switch 502a at a node 506. In an alternative embodiment, switch 502a may instead be coupled (as suggested by the dotted line) to a node 508 as a switchable bypass periphery circuit calibration ("BPC2") path (with similar connections for the other Cores if desired). By setting the states of the multi-way switch complex 110, switch 502a associated with the BPC2 path 502, and switch 152 in the associated input/output circuit 124, while opening all other illustrated switches, an RF test signal from the transmit circuitry 104 can be conveyed through Core 1, through the associated output amplifier 154a, and then directly to the receive circuitry 116. Accordingly, the characteristics of the associated amplifier 154a in the chain of components of Core 1 can be determined without the test signal traversing any other Cores, thus testing only one Core at a time. As should be clear, by adding switches, embodiments may include both BC2 and BPC2 calibration paths for any of the Cores, as well as cross-circuit calibration ("C3") paths and/or periphery cross-circuit calibration ("PC3") paths, as in FIG. 3. In a similar manner, by adding switches, any circuit component can be bypassed to remove it from a measurement.

Inter-Chip Direct Connection Testing Configuration

Figure 6:
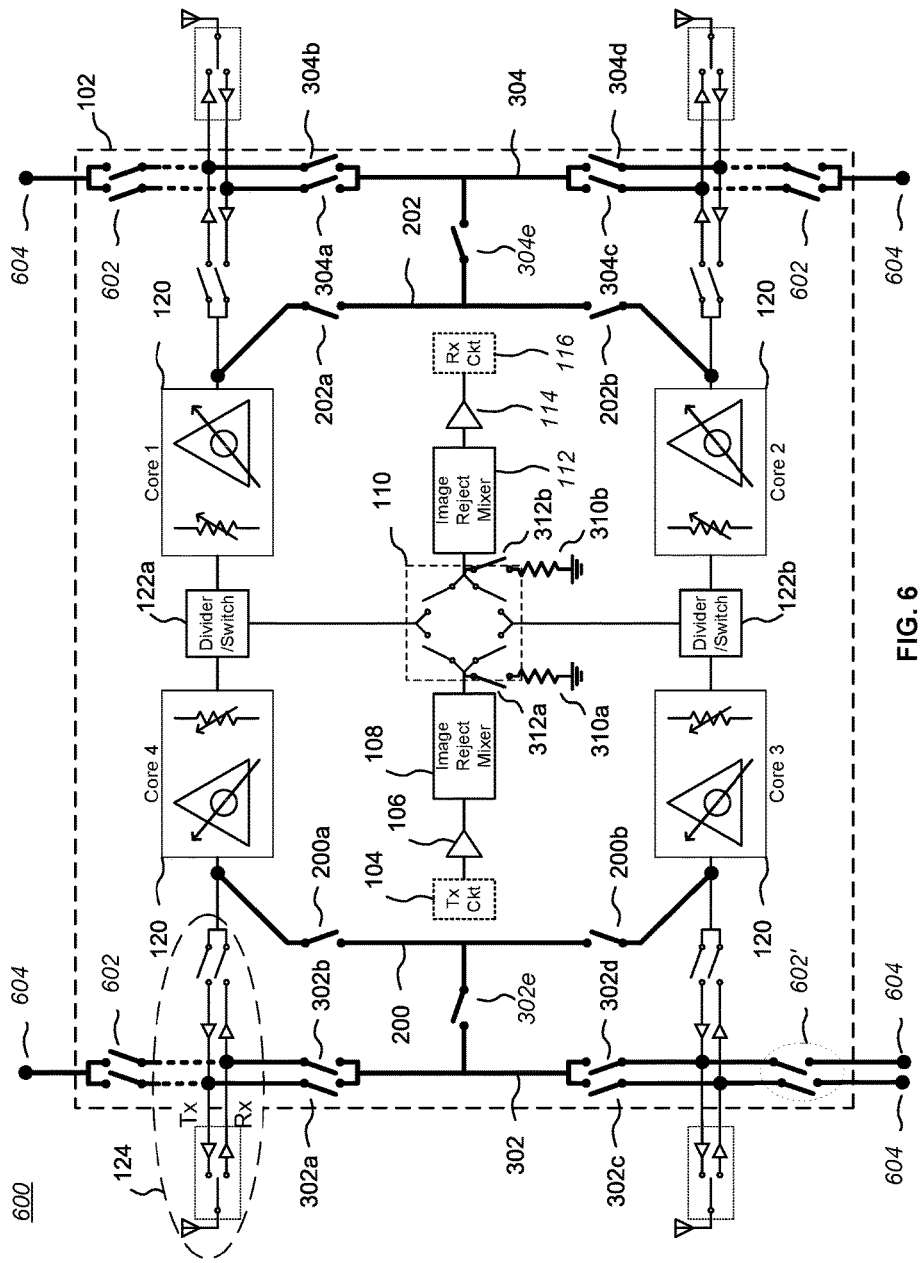
FIG. 6 is a block diagram of a fourth embodiment of an RF IC with integrated calibration circuitry suitable for use in a transceiver RF system.

The concepts described above can be extended to include inter-chip connection of signal paths that may affect an RF signal within multiple transceivers. For example, FIG. 6 is a block diagram of a fourth embodiment of an RF IC 102 with integrated calibration circuitry suitable for use in a transceiver RF system. The illustrated embodiment is essentially the same circuit configuration shown in FIG. 3, but with one or more added inter-chip switches 602 that provide for off-chip access to some part of the internal transceiver signal paths. In addition, the BC2 and BPC2 calibration paths shown in FIG. 5 can be included on the same RF IC 102 (omitted only to avoid clutter).

In the particular example shown in FIG. 6, most of the inter-chip switches 602 are each a single-pole, double-throw (SPDT) switch, and are coupled at a point "between" corresponding on-chip amplifiers 154a, 156b (see FIG. 1B) and external circuit connections for the RF IC 102. However, the inter-chip switches may alternatively comprise a pair of single-pole, single-throw (SPST) switches 602'. In either case, the switches 602, 602' may be coupled to the internal transceiver signal paths at other nodes, such as between each Core 1-4 and its associated input/output circuit 124. The switches 602, 602' have a corresponding external node 604 to provide for off-chip connections. The switches 602, 602' may be implemented, for example, as one or more FETs, or may be MEMS devices.

Figure 7:
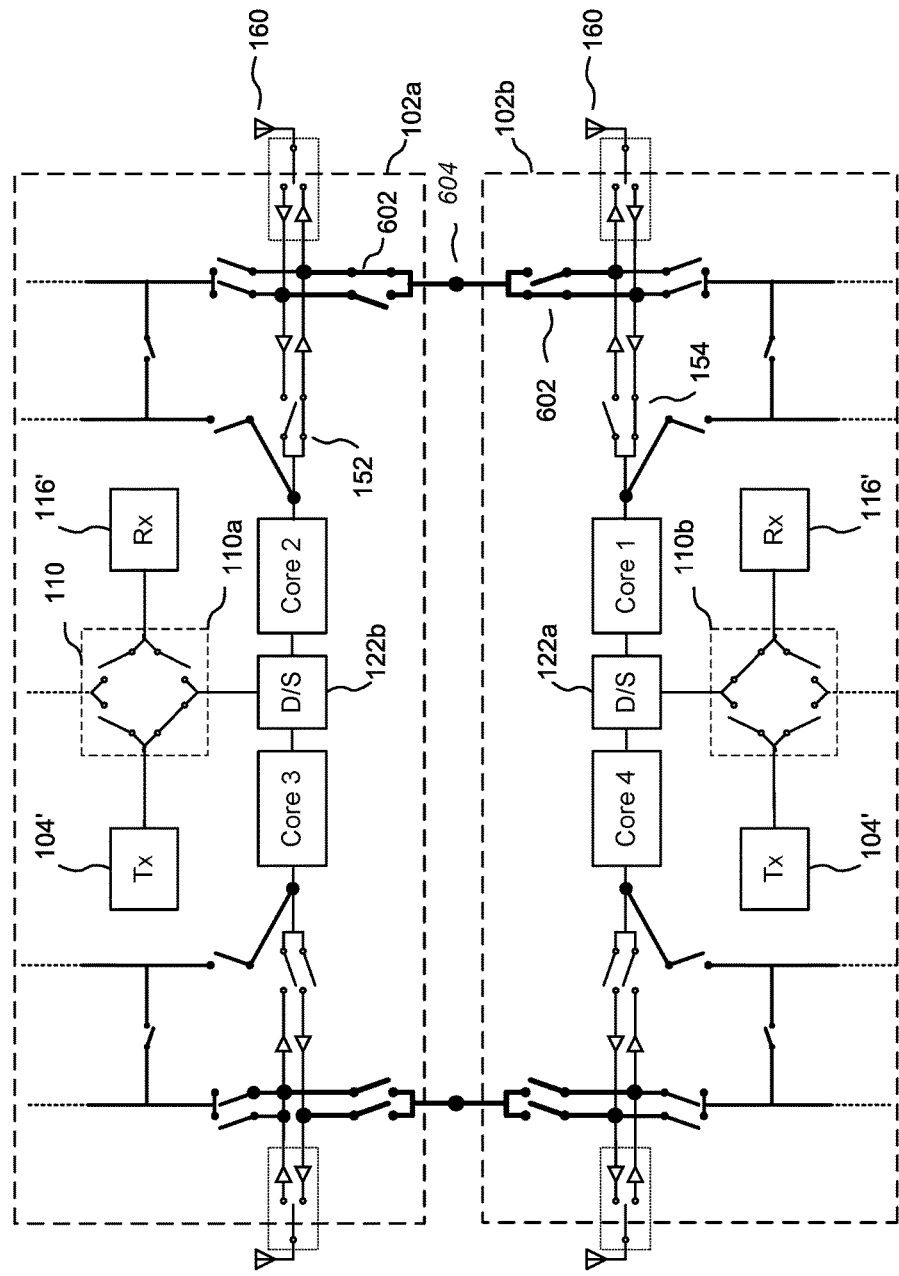
FIG. 7 is a block diagram of two interconnected instances of the embodiment of FIG. 6.

The configuration shown in FIG. 6 enables inter-chip connection of signal paths that may affect an RF signal within multiple transceivers. For example, FIG. 7 is a block diagram 700 of two interconnected instances of the embodiment of FIG. 6. In this example, the internal circuitry of each RF IC 102a, 102b has been simplified to avoid clutter. Thus, the transmit circuitry 104, isolation and/or drive buffer 106, and image reject mixer 108 of FIG. 6 have been combined into one transmitter block 104', and, similarly, the image reject mixer 112, isolation and/or drive buffer 114, and receive circuitry 116 of FIG. 6 have been combined into one receiver block 116'. Further, only the "bottom" half of RF IC 102a and the "top" half of RF IC 102b are shown, the offsetting impedances 310a, 310b of FIG. 6 are omitted, and some reference labels shown in FIG. 6 have been omitted.

In the illustrated example, the internal calibration switches of RF IC 102a are in a configuration in which a test signal from RF IC 102a is provided to an external node 604 by selectively closing internal calibration path switches. Thus, a test signal from transmitter block 104' of RF IC 102a is coupled through a corresponding multi-way switch complex 110, through Core 2, and through switches 152 and 602 to an external node 604. In the example shown in FIG. 7, the test signal is not returned by any signal path back to the receiver block 116' of RF IC 102a. However, it is possible and can be useful to return the signal path back to the receiver block 116' of RFIC 102a.

Similarly, the internal calibration switches of RF IC 102b are in a configuration in which the test signal from RF IC 102a provided at an external node 604 is coupled to the receiver block 116' of RF IC 102b by selectively closing internal calibration path switches. Thus, in the example shown in FIG. 7, the test signal at external node 604 is coupled through switches 602 and 154 of RF IC 102b, through Core 1, and through the corresponding multi-way switch complex 110 to the receiver block 116' of RF IC 102b.

As should be clear, other sets of test signal paths may be configured by alternative selections of OPEN and CLOSED states for the internal calibration path switches. Further, more possible sets of test signal paths can be configured than suggested by the particular configuration of switches shown in FIG. 7. For example, the switches 602 in FIG. 6 are shown as separate sets corresponding to each of the four illustrated input/output circuits 124. However, in alternative embodiments, a multiplexed or mesh-type switch may be coupled to m corresponding internal transmitter signal paths (e.g., each of the Tx paths of each input/output circuit 124) so as to allow a transmit test signal to be provided to a single external node 604 of an RF IC 10; similarly, a multiplexed or mesh-type switch may be coupled to m corresponding internal receive signal paths (e.g., each of the Rx paths of each input/output circuit 124) so as to allow a received test signal to be received from such a node. Such a configuration allows for m-way to m-way transmit or receive test signal path couplings to and from other RF ICs 102. In yet another alternative embodiment, a single multiplexed or mesh-type switch may be coupled to n internal transceiver signal paths (e.g., each of the Tx and Rx paths of each input/output circuit 124) so as to allow a test signal to be provided to a single external node 604 of an RF IC 102, or received from such a node. Such a configuration allows for n-way to n-way test signal path couplings to and from other RF ICs 102.

Antenna Mutual Coupling Testing Configuration

The multi-way switch complex 110 of the example embodiments described above provides for very flexible configurations of internal calibration paths for test signals. While direct connection via switchable internal calibration paths provides for accurate calibration of RF IC transceiver circuits, in some embodiments, over-the-air calibration, alone or in combination with direct signal coupling via internal calibration paths, can be accomplished by using the multi-way switch complex 110, some additional internal switches, and antenna mutual coupling. Such embodiments thus allow even more complete calibration that takes into account the RF signal path from transceiver to transceiver through over-the-air test signals.

"Antenna mutual coupling" encompasses transmission of a test signal from at least one antenna of a transmitter to at least one antenna of a receiver. Using over-the-air test signals by means of antenna mutual coupling allows characterization and calibration of all circuit element interactions between an RF IC 102 and an antenna 160. Examples of such circuit element interactions include filters, antenna-power amplifier interactions, antenna-LNA interactions, and antenna feedline length differences.

Figure 8A:
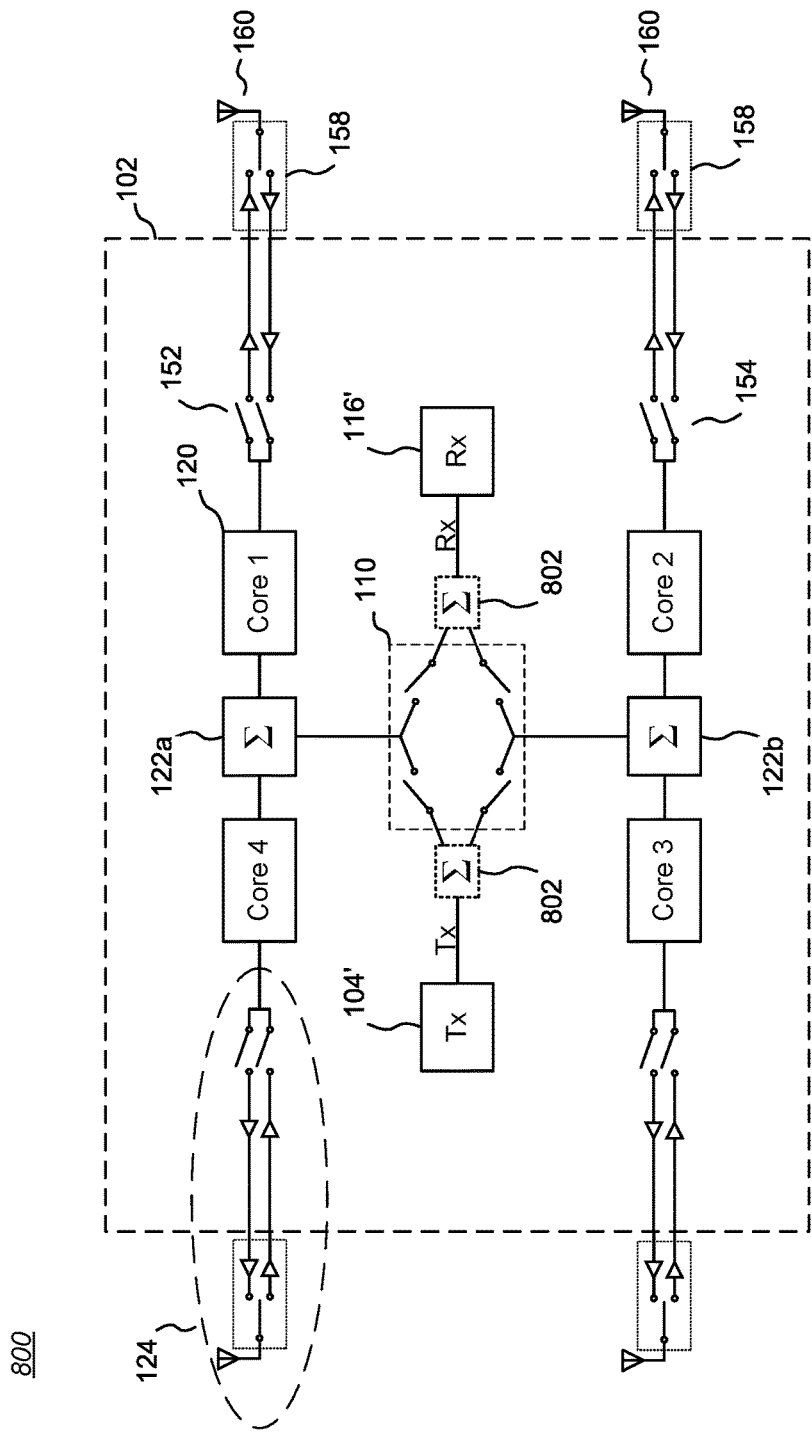
FIG. 8A is a block diagram of a general configuration for an antenna mutual coupling embodiment of an RF IC for use in a transceiver RF system.

FIG. 8A is a block diagram 800 of a general configuration for an antenna mutual coupling embodiment of an RF IC for use in a transceiver RF system. FIG. 8A is a version of FIG. 1A with the C3 paths 200, 202 and some reference labels omitted and with other simplifications to avoid clutter (e.g., the transmit circuitry 104, isolation and/or drive buffer 106, and image reject mixer 108 of FIG. 1A have been combined into one transmitter block 104', and, similarly, the image reject mixer 112, isolation and/or drive buffer 114, and receive circuitry 116 of FIG. 6 have been combined into one receiver block 116'). In addition, the offsetting impedances 310a, 310b of FIG. 6 are omitted. In the "general configuration" shown in FIG. 8A, all switches 110, 152, 154, 158 of the RF IC 102 or connecting the RF IC 102 to the antennas 160 are open.

In this example, an optional power splitter/combiner 802 is coupled between the transmitter block 104' and the multi-way switch complex 110, and between the multi-way switch complex 110 and the receiver block 116'. While not necessary for DC and low frequency signals since the receiver block 116' provides for signal directivity, each power splitter/combiner 802 provides useful signal directivity for RF signals. In the alternative or in addition, offsetting impedances 310a, 310b (shown as absorptive shunt resistors in FIG. 6, by way of example) may be coupled by associated switches 312a, 312b to the multi-way switch complex 110; the switches associated with the offsetting impedances may be implemented, for example, as one or more FETs or MEMS devices.

Figure 8B:
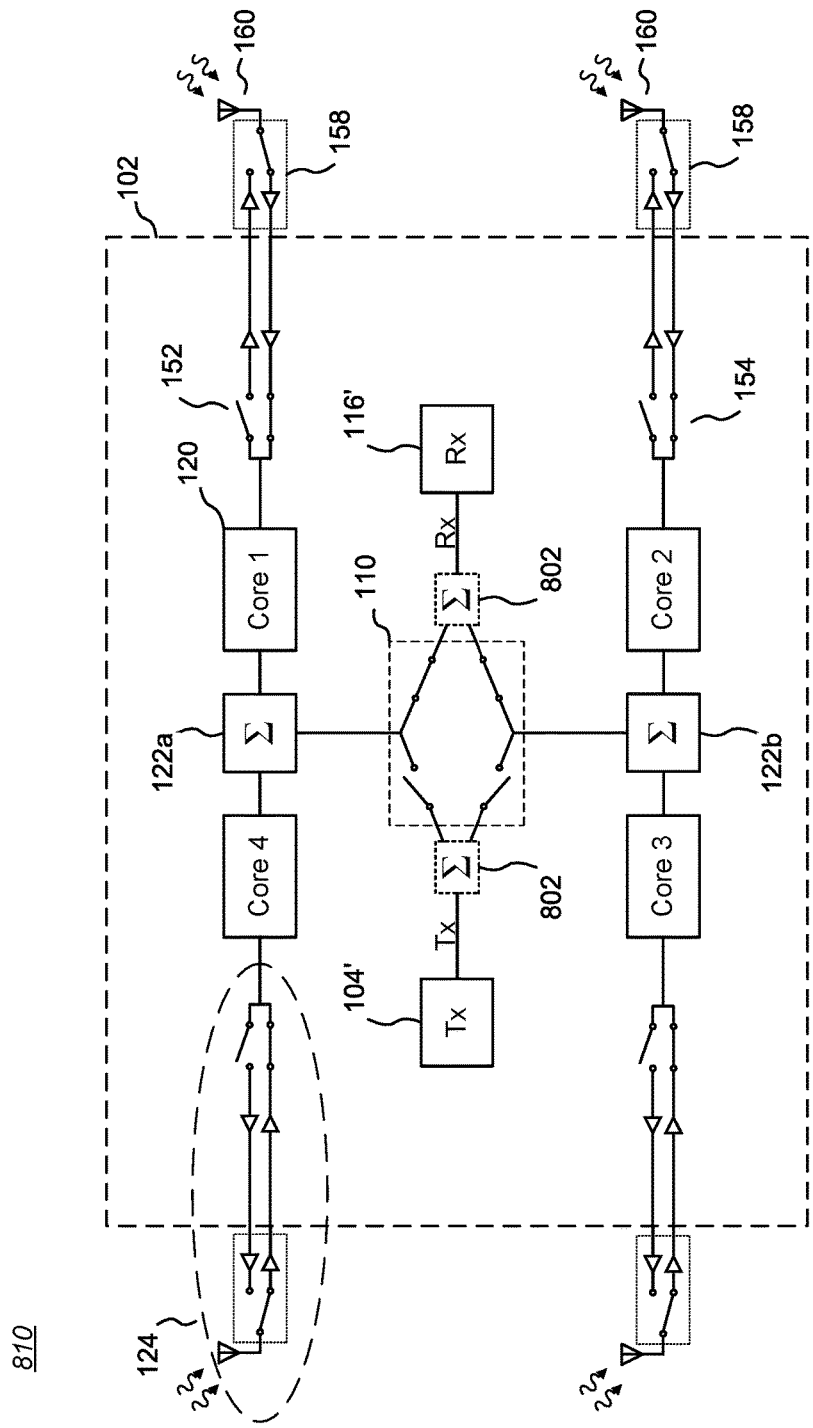
FIG. 8B is a block diagram of the antenna mutual coupling embodiment of FIG. 8A in an "all channels receiving" configuration.
Figure 8C:
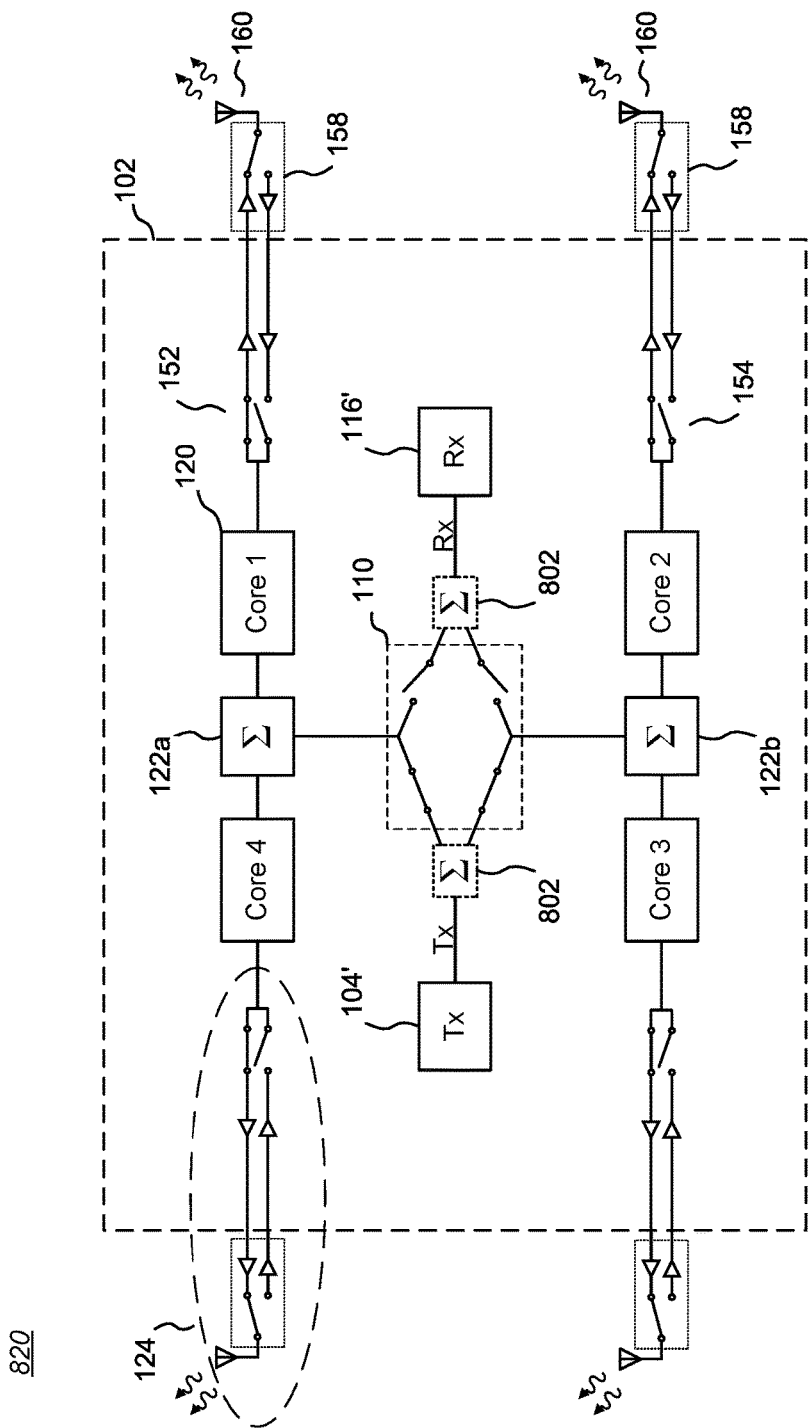
FIG. 8C is a block diagram of the antenna mutual coupling embodiment of FIG. 8A in an "all channels transmitting" configuration.

FIG. 8B is a block diagram 810 of the antenna mutual coupling embodiment of FIG. 8A in an "all channels receiving" configuration. All of the "inbound" switches 110, 154, 158 are set to couple over-the-air signals received by the antennas 160 through respective Cores 1-4 to the receiver block 116'. In contrast, FIG. 8C is a block diagram 820 of the antenna mutual coupling embodiment of FIG. 8A in an "all channels transmitting" configuration. All of the "outbound" switches 110, 152, 158 are set to couple signals from the transmitter block 104' to the antennas 160 through respective Cores 1-4 for transmission as over-the-air signals. In an RF transceiver operating under a time division duplex (TDD) communication protocol, data signal reception and transmission will normally alternate between the two modes shown in FIGS. 8B and 8C. Note that while all channels are either receiving or transmitting in such modes, the phase and attenuation applied to signals in each channel may vary depending on the settings applied to the respective Cores 1-4, for example, for signal beamforming.

Figure 8D:
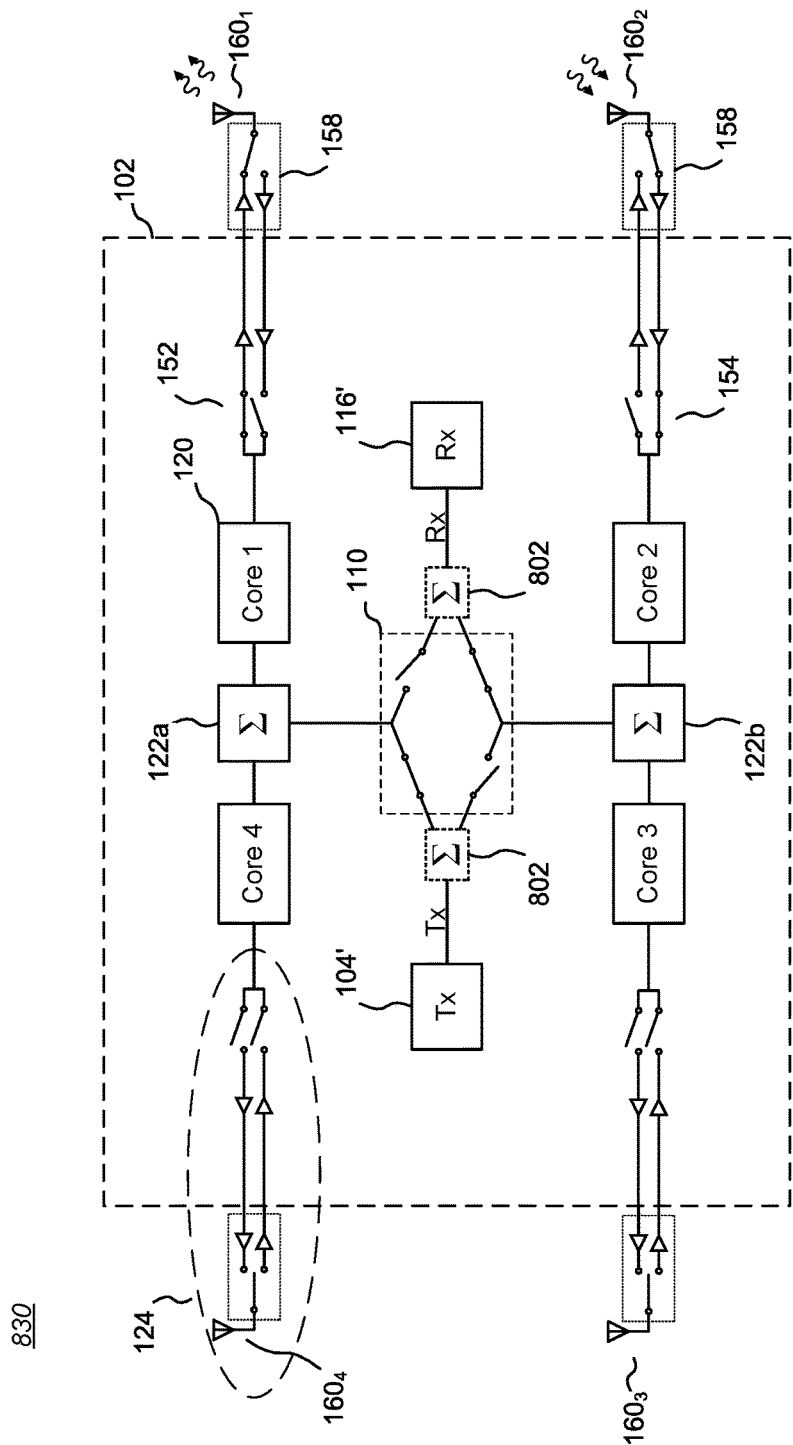
FIG. 8D is a block diagram of the antenna mutual coupling embodiment of FIG. 8A in a first loop-back mode configuration.

FIG. 8D is a block diagram 830 of the antenna mutual coupling embodiment of FIG. 8A in a first loop-back mode configuration. In this configuration, all of the "inbound" and "outbound" switches 110, 152, 154, 158 are set to couple test signals from the transmitter block 104' to the antenna 1601 of Core 1 for transmission as over-the-air signals, and to couple such over-the-air signals as received by the antenna 1602 of Core 2 to the receiver block 116'. As should be clear, reversing the state of some of the switches 110, 152, 154, 158 would enable over-the-air transmission of test signals through Core 2 to Core 1.

Figure 8E:
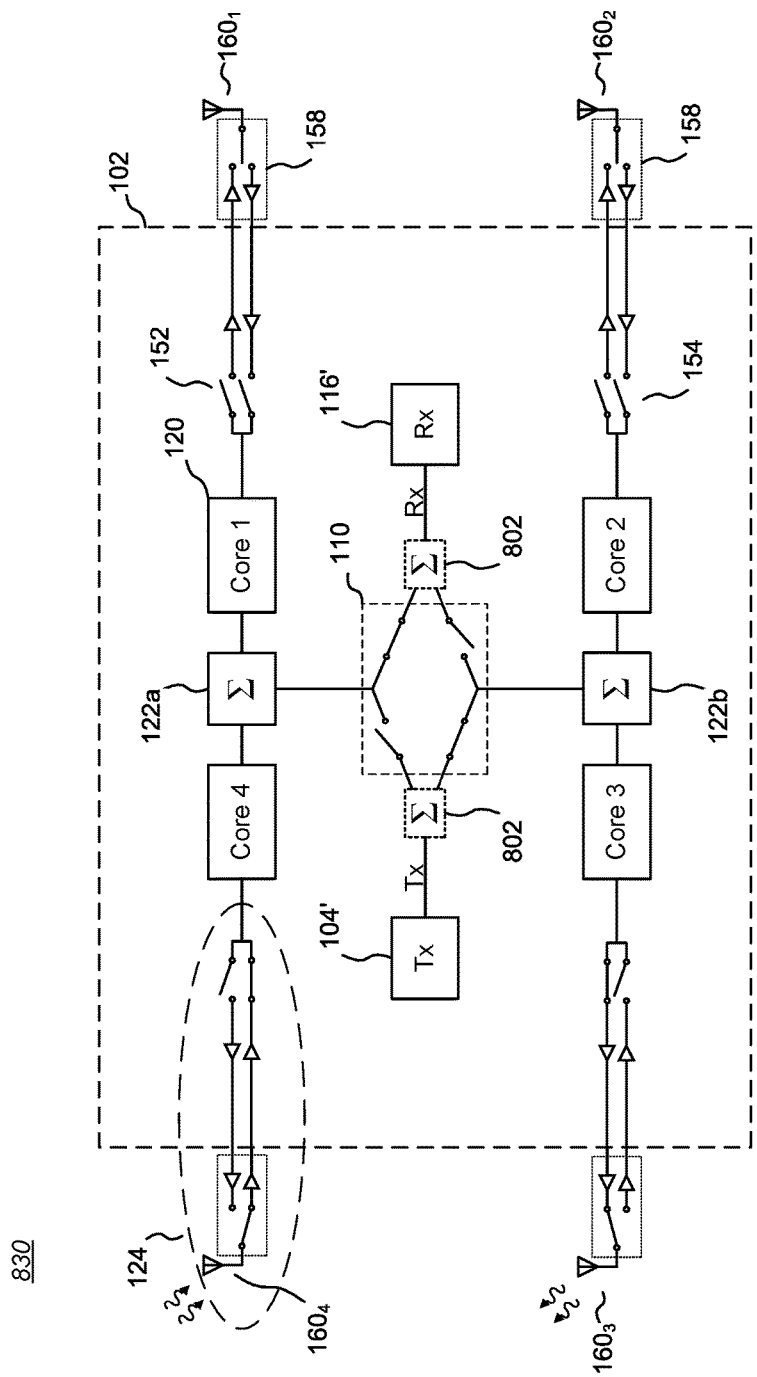
FIG. 8E is a block diagram of the antenna mutual coupling embodiment of FIG. 8A in a second loop-back mode configuration.

FIG. 8E is a block diagram of the antenna mutual coupling embodiment of FIG. 8A in a second loop-back mode configuration. In this configuration, all of the "inbound" and "outbound" switches 110, 152, 154, 158 are set to couple test signals from the transmitter block 104' to the antenna 1603 of Core 3 for transmission as over-the-air signals, and to couple such over-the-air signals as received by the antenna 1604 of Core 4 to the receiver block 116'. Again, as should be clear, reversing the state of some of the switches 110, 152, 154, 158 would enable over-the-air transmission of test signals through Core 4 to Core 3.

In both of the loop-back configurations of FIGS. 8D and 8E, it is generally desirable to disable, disconnect, and/or isolate circuit paths that are not under test. For example, in FIG. 8D, the circuit path that includes Core 3 would be disabled, disconnected, and/or isolated to prevent reception of over-the-air signals from antenna 1601 from being coupled to the receiver block 116' via antenna 1603. Similarly, the circuit path that includes Core 4 would be disabled, disconnected, and/or isolated to prevent transmission of over-the-air signals from the transmitter block 104' via antenna 1604. Disablement, disconnection, and/or isolation may be achieved, for example, by switching the amplifiers 154, 156 in paths not under test to OFF or to some inactive state, by opening the switches 152, 154, 148 in the input/output circuit 124, and/or by switching in shunt connections between circuit ground and one or more locations on a circuit path.

In addition to the transmit-receive calibration combinations mentioned above, it should be clear that over-the-air transmission of test signals can be sent through any RF transceiver front-end circuit to any other RF transceiver front-end circuit that can be isolated from the transmitting RF transceiver front-end circuit. For example, over-the-air test signals can be sent through Core 3 to Core 1, and vice versa, and through Core 2 to Core 4 and vice versa, since each of the corresponding calibration signal paths can be isolated from each other by appropriate configuration of the multi-way switch complex 110.

Further, as noted above, impedance mismatches may occur due to asymmetric loading (e.g., of the divider/switches 122a, 122b or of the power splitters/combiners 802) as an RF test signal is routed through only one set of cores (e.g., Core 1 and Core 2) while other sets of cores (e.g., Core 3 and Core 4) are set to be in an essentially disable, disconnected, and/or isolated state. To counteract such mismatches, offsetting impedances 310a, 310b (shown as absorptive shunt resistors in FIG. 6, by way of example) optionally may be coupled by associated switches 312a, 312b to the multi-way switch complex 110. While only two such offsetting impedances 310a, 310b are shown (on the "bottom" side of the multi-way switch complex 110), for layout symmetry, it may be desirable to provide similar switched impedances on the "top" side of the multi-way switch complex 110, particularly if power splitters/combiners 802 are used (so that each individual switch 110a-110d of the multi-way switch complex 110 has an associated switchable offsetting impedance). The switches associated with the offsetting impedances may be implemented, for example, as one or more FETs or MEMS devices.

Figure 9:
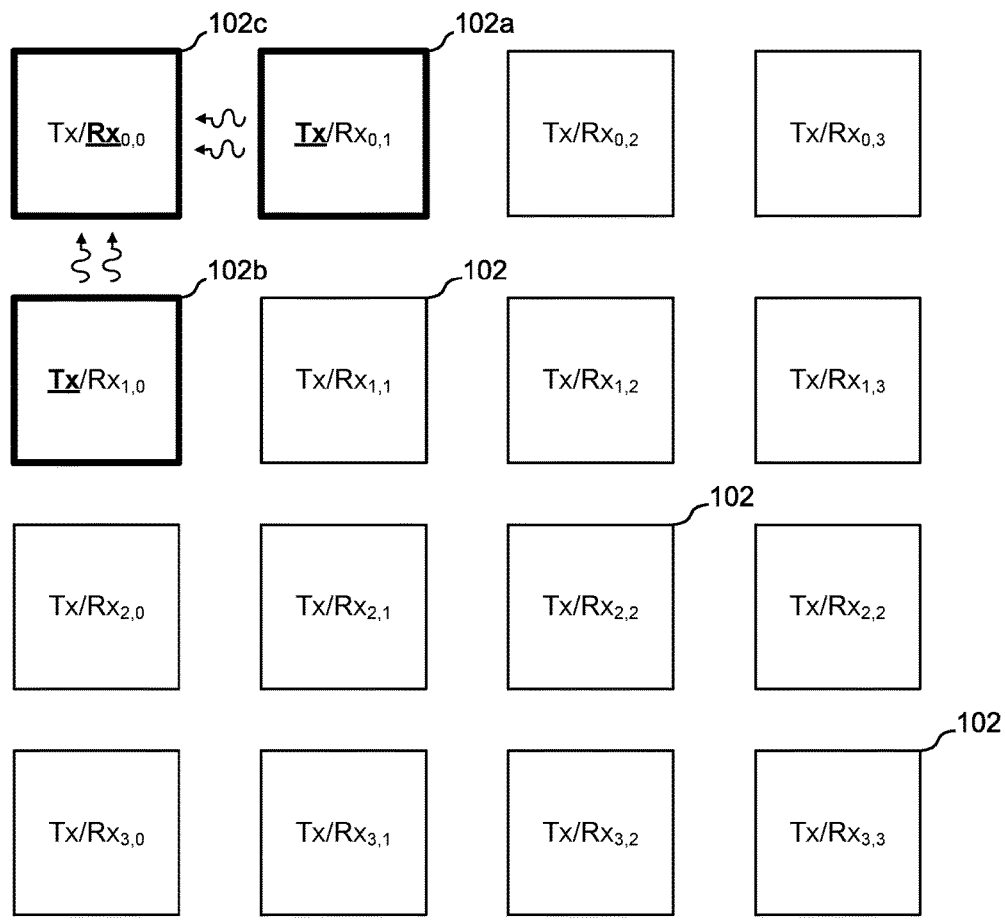
FIG. 9 is a block diagram showing multiple instances of the antenna mutual coupling RF IC of FIG. 8A configured for an inter-chip loop-back mode.

FIG. 9 is a block diagram showing multiple instances of the antenna mutual coupling RF IC 102 of FIG. 8A configured for an inter-chip loop-back mode. In this example, RF ICs 102a and 102b are each configured in a calibration mode to transmit a test signal from a designated channel over-the-air to a target RF IC 102c, which is configured in a calibration mode to receive the test signal via a designated channel. As should be clear, calibration may take into account any desired combination of one or more transmitting RF ICs 102 to any combination of one or more receiving RF ICs 102. Doing so allows mapping of nominal phase and amplitude control states to actual phase shift and amplitude (attenuation or amplification) levels to determine correction weights for each nominal state.

Of note with respect to the self-calibration ability of embodiments of the present invention: because calibration test signals traverse both the primary RF transmission path Tx and the primary RF reception path Rx, what is actually measured is the product of the gain of the Tx path and the Rx path. Since the actual gain of either the Tx path or the Rx path is generally not known (absent use of a special independent testing system), to use the measured products for calibration, ratios may be computed in which one of the product factors is in both the numerator and denominator, and hence cancels out. Accordingly, during calibration, ratios can be determined of Tx gain between any two isolatable channels and of Rx gain between any two isolatable channels. Hence, all channel (complex) gains (symbol "G") can be equalized with only a single unknown scale factor applicable to all channels. For example, in an array of 4-channel Rx paths, estimated $\{G_{Tx1}*G_{Rx3}\}$/estimated $\{G_{Tx1}*G_{Rx2}\}$=estimated $\{G_{Rx3}/G_{Rx2}\}$; similar estimates can be determined for $G_{Rx1}/G_{Rx4}$, $G_{Rx4}/G_{Rx3}$ and $G_{Rx2}/G_{Rx1}$. Any three of these four ratios permit determination of a complete calibration of the four channels, subject to an unknown scale factor applicable to all channels. Other independent combinations (e.g., $G_{Rx3}/G_{Rx1}$, etc.) may be determined in order to reduce measurement noise, but are not strictly needed.

By taking advantage of the flexibility in signal directivity provided by the multi-way switch complex 110, calibration using over-the-air test signals communicated by mutual antenna coupling does not require any other internal calibration switches in an RF IC 102, as shown in FIG. 8A. Accordingly, an "over-the-air only" RF IC calibration configuration saves switch hardware relative to configurations that include internal calibration paths with associated switches (e.g., C3, PC3, BC2, and/or BPC2 paths). However, as should be clear from FIG. 6, circuitry for implementing both methods of calibration may be included on a single RF IC 102, allowing for intra-chip direct connection calibration, inter-chip direct connection calibration (via inter-chip switches 602, 602'), and/or inter-chip over-the-air calibration (via signals transmitted between antennas 160). Notably, for over-the-air calibration, only normally operational antennas and associated circuitry are required for such calibration—no dedicated calibration antennas and associated dedicated calibration circuitry are required, nor are any external dedicated calibration equipment or facilities required. Further, over-the-air calibration using RF ICs having a multi-way switch complex 110 is suitable for use with any number of antenna elements, unlike prior art sparse antenna calibration methods.

Benefits

One usage of the inventive concepts is periodic self-calibration of an RF IC 102 by characterizing the performance of the various phase-attenuation core circuits, periphery amplifier circuits, the circuit components within the end-to-end IF signal path, and over-the-air signal paths through antennas and related circuit elements, and then adjusting one or more of such circuits to tune for one or more desired performance parameters (e.g., bandwidth, insertion loss, linearity, etc.). It is thus possible to apply a pseudo closed-loop calibration mechanism from time to time.

Embodiments of the invention include one or more on-chip switchable internal calibration paths that enable direct coupling of a transmit-to-receive signal path of the on-chip circuit to an RF test system while isolating other circuitry on the chip. Some embodiments allow interconnection of switchable internal calibration paths between separate IC chips. Still other embodiments utilize internal switches and antenna mutual coupling to provide over-the-air calibration, alone or in combination with direct signal coupling via internal calibration paths. Advantages of various embodiments of the invention include a calibration architecture that enables accurate calibration of RF ICs used in transceiver RF systems in a relatively simple testing environment that is done by direct connection (as opposed to over-the-air) at significantly lower frequencies. Accordingly, environmental factors in the test set-up that alter, shield, attenuate, distort, or otherwise affect transmitted and received over-the-air test signals are eliminated or significantly mitigated. However, when desirable, intra-chip and inter-chip over-the-air calibration can be conducted by suitably setting the multi-way switch complex 110 of one or more RF ICs 102.

Further, periodic self-calibration of an RF IC in accordance with the present invention can be performed after initial factory calibration, so that adjustments in desired performance parameters (e.g., bandwidth, insertion loss, linearity, etc.) can be made while such an IC is embedded within a final system, and thus take into account the actual usage environment (including, for example, temperature, electrically "noisy" circuitry, parasitic electromagnetic coupling, etc.). Periodic self-calibration also allows re-characterization of such an RF IC to take into account component degradation due to age or other factors. It is thus possible to apply a pseudo closed-loop calibration mechanism from time to time.

Note also that it is possible to do calibration testing as part of an over-the-air transmission where all paths to connected antennas 160 would transmit as normal except for one path being tested (e.g., through an associated Core and/or part of an associated input/output circuit 124). The path being tested would be disconnected from its associated antenna and at least the associated core would be evaluated. In such a case, the "RF test signal" may be just a normal RF transmission signal.

It should also be noted that while the above description and accompanying figures are directed to a transceiver RF system configured for a time division duplex (TDD) communication protocol, some or all of the same concepts may be applied to a transceiver RF system configured for a frequency division duplex (FDD) communication protocol or for other types of communication protocols employing one or more transceivers.

Methods

Figure 10:
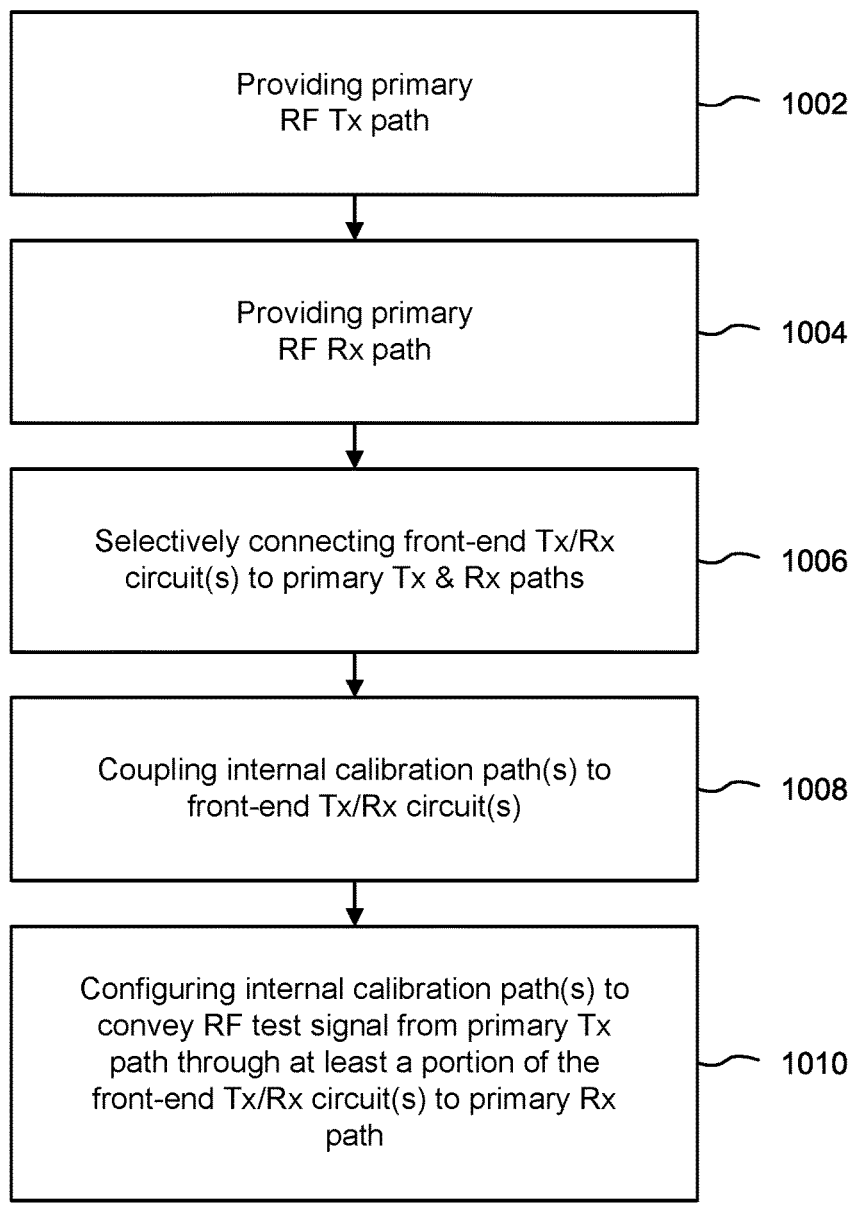
FIG. 10 is a flowchart showing a first method for calibrating a radio frequency (RF) integrated circuit.

Another aspect of the invention includes methods for calibrating a radio frequency (RF) integrated circuit. FIG. 10 is a flowchart 1000 showing a first method for calibrating a radio frequency (RF) integrated circuit, including: providing a primary RF transmission path (STEP 1002); providing a primary RF reception path (STEP 1004); selectively connecting at least one RF transceiver front-end circuit to the primary RF transmission path and the primary RF reception path (STEP 1006); coupling at least one switchable internal calibration path [e.g., a cross-circuit calibration (C3) or periphery cross-circuit calibration (PC3) or bypass circuit calibration (BC2) or bypass periphery circuit calibration (BPC2) path] to the at least one RF transceiver front-end circuit (STEP 1008); and configuring the at least one switchable internal calibration path to convey, in a calibration mode, an RF test signal from the primary RF transmission path through at least a portion of the coupled at least one RF transceiver front-end circuit to the primary RF reception path (STEP 1010).

Figure 11:
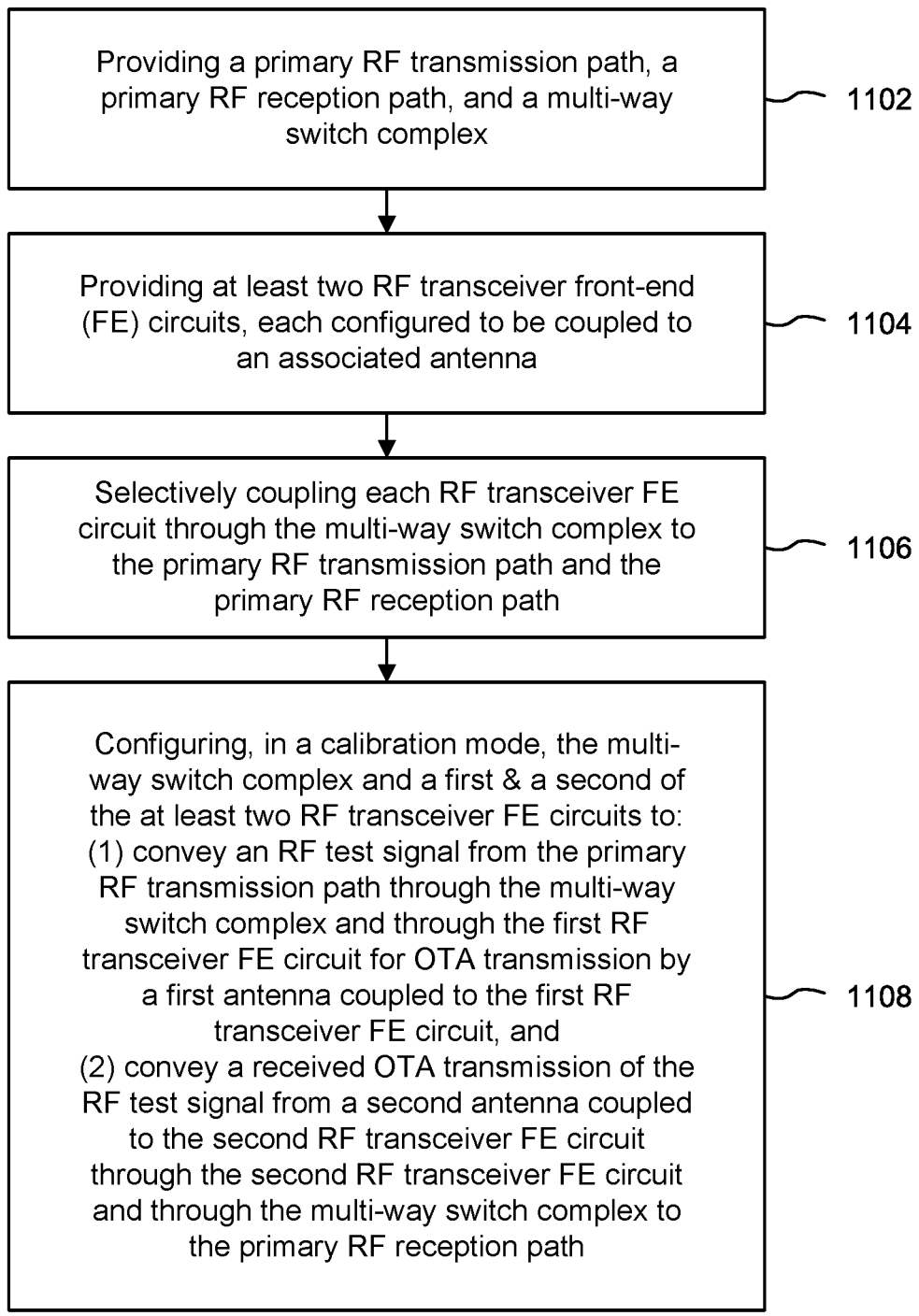
FIG. 11 is a flowchart showing another method for calibrating a radio frequency (RF) integrated circuit.

FIG. 11 is a flowchart 1100 showing another method for calibrating a radio frequency (RF) integrated circuit, including: providing a primary RF transmission path, a primary RF reception path, and a multi-way switch complex (STEP 1102); providing at least two RF transceiver front-end (FE) circuits, each configured to be coupled to an associated antenna (STEP 1104); selectively coupling each RF transceiver front-end circuit through the multi-way switch complex to the primary RF transmission path and the primary RF reception path (STEP 1106); and configuring, in a calibration mode, the multi-way switch complex and a first and a second of the at least two RF transceiver front-end circuits to: (1) convey an RF test signal from the primary RF transmission path through the multi-way switch complex and through the first RF transceiver front-end circuit for over-the-air (OTA) transmission by a first antenna coupled to the first RF transceiver front-end circuit, and (2) convey a received over-the-air transmission of the RF test signal from a second antenna coupled to the second RF transceiver front-end circuit through the second RF transceiver front-end circuit and through the multi-way switch complex to the primary RF reception path (STEP 1108).

Other aspects of the above methods include: minimizing the effects on the RF test signal of all but one of the coupled at least one RF transceiver front-end circuit so as to relatively isolate any remaining coupled RF transceiver front-end circuits; at least one RF transceiver front-end circuit being a phase-attenuation core; each RF transceiver front-end circuit being a phase-attenuation core; at least one RF transceiver front-end circuit being an input/output circuit; each RF transceiver front-end circuit being an input/output circuit; providing a direct or indirect intermediate frequency path bypass switch coupled between the primary RF transmission path and the primary RF reception path, and selectively coupling the RF test signal from the primary RF transmission path to the primary RF reception path; and providing one or more offsetting impedances selectably connectable to at least one of the primary RF transmission path or primary RF reception path, and connecting the one or more offsetting impedances to at least one of the primary RF transmission path or primary RF reception path during the calibration mode.

Yet another aspect of the invention includes a method for calibrating a radio frequency (RF) integrated circuit, including: providing a primary RF transmission path; providing a primary RF reception path; providing at least two RF transceiver front-end circuits each selectively connectable to the primary RF transmission path and the primary RF reception path, each RF transceiver front-end circuit including a phase-attenuation core and an associated input/output circuit; providing at least one switchable internal calibration path coupled to the at least two RF transceiver front-end circuits; configuring the at least one switchable internal calibration path to convey, in a calibration mode, an RF test signal from the primary RF transmission path through at least a portion of the coupled at least two RF transceiver front-end circuits to the primary RF reception path; and during the calibration mode, minimizing the effects on the RF test signal of all but one of the coupled at least two RF transceiver front-end circuits so as to relatively isolate the remaining coupled RF transceiver front-end circuit.

Other aspects of the above methods include: providing a direct or indirect intermediate frequency path bypass switch coupled between the primary RF transmission path and the primary RF reception path, and selectively coupling the RF test signal from the primary RF transmission path to the primary RF reception path; providing one or more offsetting impedances selectably connectable to at least one of the primary RF transmission path or primary RF reception path, and connecting the one or more offsetting impedances to at least one of the primary RF transmission path or primary RF reception path during the calibration mode; and providing at least a first and a second switchable internal calibration paths, the at least first switchable internal calibration path being selectively connectable to the phase-attenuation cores of each of the at least two RF transceiver front-end circuits, and the at least second switchable internal calibration path being selectively connectable to the associated input/output circuit of each of the at least two RF transceiver front-end circuits.

Further aspects of the above methods include: at least one RF transceiver front-end circuit including at least one of a phase-attenuation core or an input/output circuit; each RF transceiver front-end circuit including a phase-attenuation core; each RF transceiver front-end circuit including an input/output circuit; at least one RF transceiver front-end circuit including an input/output circuit that includes at least one of a power amplifier and/or a low noise amplifier; coupling an indirect intermediate frequency (IF) path bypass switch between an IF portion of the primary RF transmission path and an IF portion of the primary RF reception path, and selectively coupling the RF test signal from the primary RF transmission path to the primary RF reception path; adjusting desired performance parameters of the RF integrated circuit based on the results of the calibration mode; performing a first calibration mode pass through the indirect IF path bypass switch, performing a second calibration mode pass through at least one RF transceiver front-end circuit, and subtracting the results of the first calibration mode pass from the results of the second calibration mode pass; coupling a direct intermediate frequency (IF) path bypass switch between an IF portion of the primary RF transmission path and an IF portion of the primary RF reception path, and selectively coupling the RF test signal from the primary RF transmission path to the primary RF reception path; adjusting desired performance parameters of the RF integrated circuit based on the results of the calibration; performing a first calibration mode pass through the direct IF path bypass switch, performing a second calibration mode pass through at least one RF transceiver front-end circuit, and subtracting the results of the first calibration mode pass from the results of the second calibration mode pass; and selectably connecting one or more offsetting impedances to at least one of the primary RF transmission path or primary RF reception path to offset impedance mismatches due to asymmetric loading of one or more switchable internal calibration paths during the calibration mode.

Still further aspects of the above methods include: at least one phase-attenuation core including a signal amplitude control circuit that includes an attenuator circuit for providing a reduction in amplitude of an applied signal; at least one phase-attenuation core including a signal amplitude control circuit that includes an amplifier that amplifies an applied signal to effectively provide negative attenuation; at least one switchable internal calibration path being a switchable cross-circuit calibration path between at least two RF transceiver front-end circuits and the primary RF reception path and configured for conveying, in the calibration mode, the RF test signal from the primary RF transmission path through such at least two RF transceiver front-end circuits to the primary RF reception path; at least one RF transceiver front-end circuit including an input/output circuit, and wherein at least one switchable cross-circuit calibration path is a periphery cross-circuit calibration path configured for conveying, in the calibration mode, the RF test signal from the primary RF transmission path through at least a portion of such input/output circuit of such at least one RF transceiver front-end circuit to the primary RF reception path; at least one switchable internal calibration path being a switchable bypass circuit calibration path between at least one RF transceiver front-end circuit and the primary RF reception path and configured for conveying, in the calibration mode, the RF test signal from the primary RF transmission path through such at least one RF transceiver front-end circuit directly to the primary RF reception path; and at least one RF transceiver front-end circuit including an input/output circuit, and wherein at least one switchable bypass circuit calibration path is a bypass periphery circuit calibration path configured for conveying, in the calibration mode, the RF test signal from the primary RF transmission path through at least a portion of such input/output circuit of such at least one RF transceiver front-end circuit directly to the primary RF reception path.

Other aspects of the above methods include: minimizing the effects on the RF test signal of all but one of the coupled at least one RF transceiver front-end circuit so as to relatively isolate any remaining coupled RF transceiver front-end circuits; minimizing the effects on the RF test signal by RF transceiver front-end circuits not being calibrated but conveying the RF test signal, by configuring such RF transceiver front-end circuits to a minimum amplitude adjustment and/or approximately zero phase shift; minimizing the effects on the RF test signal by RF transceiver front-end circuits not conveying the RF test signal, by configuring such RF transceiver front-end circuits to maximum attenuation; minimizing the effects on the RF test signal by RF transceiver front-end circuits not conveying the RF test signal, by configuring each switchable internal calibration path coupled to such RF transceiver front-end circuits to an open state; coupling a switchable termination circuit to the at least one RF transceiver front-end, and minimizing the effects on the RF test signal by such RF transceiver front-end circuits not conveying the RF test signal, by configuring such switchable termination circuits to a shunt mode; minimizing the effects on the RF test signal by RF transceiver front-end circuits not being calibrated but conveying the RF test signal, by configuring such RF transceiver front-end circuits to a minimum amplitude adjustment and/or approximately zero phase shift, and minimizing the effects on the RF test signal by RF transceiver front-end circuits not conveying the RF test signal, by configuring such RF transceiver front-end circuits to maximum attenuation and by configuring each switchable internal calibration path coupled to such RF transceiver front-end circuits to an open state; conveying the RF test signal through at least two RF transceiver front-end circuits; concurrently conveying the RF test signal through at least two parallel sets of at least one serially-connected RF transceiver front-end circuit; performing an initial calibration mode when the RF integrated circuit is manufactured; adjusting desired performance parameters of the RF integrated circuit based on the results of the calibration mode; mapping nominal phase and amplitude control states to actual phase shift and amplitude levels determined during the calibration mode; varying the RF test signal over a desired frequency range; and/or performing the calibration mode periodically after the RF integrated circuit is manufactured to take into account an actual usage environment, which may include temperature.

Fabrication Technologies and Options

To further minimize any effect on calibration characterization, Cores that do not convey an RF test signal can also be coupled at various points to switchable termination circuitry. For example, referring to FIG. 5, terminating shunt switches (not shown) to circuit ground (or other reference potential) can be positioned at nodes 510 between associated Cores 120 and their associated divider/switch 122a, 122b. A terminating shunt switch would have essentially no effect on the associated node 510 when the switch is open, and would connects a termination impedance (such as 50 ohms) to circuit ground (or other reference potential) when the switch is closed. Terminating shunt switches may be implemented, for example, as one or more FETs or MEMS devices. A shunt switch can be set to a shunt mode in which the connecting node to an associated Core is coupled to circuit ground. As should be clear, embodiments may include such switchable termination circuitry at other positions with respect to the Cores, such as between each Core and its associated input/output circuit 124. As another example of isolation, bias voltages to any active devices (e.g., FETs) within the Cores that do not convey an RF test signal can be set to an OFF state.

The term "MOSFET", as used in this disclosure, means any field effect transistor (FET) with an insulated gate and comprising a metal or metal-like, insulator, and semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET and IGFET structures), or in hybrid or discrete circuit forms. Integrated circuit embodiments may be fabricated using any suitable substrates and processes, including but not limited to standard bulk silicon, silicon-on-insulator (SOI), silicon-on-sapphire (SOS), GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, good isolation in the non-conducting OFF state to avoid leakage of signals into other circuitry, the ability to withstand high power signals during operation due to FET stacking, good linearity, and high frequency operation (in excess of about 10 GHz, and particularly above about 20 GHz). Monolithic IC implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarding as starting a conflicting labeling sequence).

What is claimed is:

1. A method for calibrating a radio frequency (RF) integrated circuit, including:
   (a) providing a primary RF transmission path and a primary RF reception path on an integrated circuit;
   (b) selectively connecting at least one RF transceiver front-end circuit through a multi-way switch complex to the primary RF transmission path and the primary RF reception path;
   (c) coupling at least one switchable internal calibration path to the at least one RF transceiver front-end circuit;
   (d) configuring the at least one switchable internal calibration path to convey, in a calibration mode, an RF test signal from the primary RF transmission path through the multi-way switch complex and thence through at least a portion of the coupled at least one RF transceiver front-end circuit to the primary RF reception path; and
   (e) providing at least one inter-chip switch for enabling selectable access from external to the integrated circuit to at least one of the primary RF transmission path, the primary RF reception path, and/or the at least one switchable internal calibration path; wherein at least one RF transceiver front-end circuit comprises a phase-attenuation core.

2. A radio frequency (RF) integrated circuit including:
   (a) a primary RF transmission path;
   (b) a primary RF reception path;
   (c) at least one RF transceiver front-end circuit, each selectively connectable to the primary RF transmission path and the primary RF reception path; and
   (d) at least one switchable internal calibration path selectively configurable between the primary RF transmission path and the primary RF reception path to convey, in a calibration mode, a test signal from the primary RF transmission path to the primary RF reception path through at least a portion of at least one RF transceiver front-end circuit undergoing calibration;
   wherein RF transceiver front-end circuits not undergoing calibration are relatively isolated from RF transceiver front-end circuits undergoing calibration.

3. The invention of claim 2, wherein at least one RF transceiver front-end circuit includes a phase-attenuation core.

4. The invention of claim 3, wherein at least one phase-attenuation core includes a signal amplitude control circuit that includes an attenuator circuit for providing a reduction in amplitude of an applied signal.

5. The invention of claim 3, wherein at least one phase-attenuation core includes a signal amplitude control circuit that includes an amplifier that amplifies an applied signal to effectively provide negative attenuation.

6. The invention of claim 2, wherein at least RF transceiver front-end circuit includes an input/output circuit.

7. The invention of claim 6, wherein the input/output circuit includes at least one of a power amplifier and/or a low noise amplifier.

8. The invention of claim 2, wherein at least one RF transceiver front-end circuit includes a phase-attenuation core and an input/output circuit.

9. The invention of claim 2, further including a selectable intermediate frequency (IF) bypass path for coupling an IF portion of the primary RF transmission path to an IF portion of the primary RF reception path.

10. The invention of claim 9, wherein a first calibration mode pass is performed through the IF path bypass, a second calibration mode pass is performed through at least one RF transceiver front-end circuit, results of the first calibration mode pass are subtracted from results of the second calibration mode pass, and results of the subtraction are used to adjust performance parameters of the RF integrated circuit.

11. The invention of claim 2, wherein the test signal is an intermediate frequency test signal.

12. The invention of claim 2, further including one or more offsetting impedances selectably connectable to at least one of the primary RF transmission path or primary RF reception path to offset impedance mismatches due to asymmetric loading of one or more switchable internal calibration paths during the calibration mode.

13. The invention of claim 2, wherein at least one switchable internal calibration path is a switchable cross-circuit calibration path between at least two RF transceiver front-end circuits and the primary RF reception path and configured to convey, in the calibration mode, the test signal from the primary RF transmission path through such at least two RF transceiver front-end circuits to the primary RF reception path.

14. The invention of claim 13, wherein at least one RF transceiver front-end circuit includes an input/output circuit, and wherein at least one switchable cross-circuit calibration path is a periphery cross-circuit calibration path configured to convey, in the calibration mode, the test signal from the primary RF transmission path through at least a portion of such input/output circuit of such at least one RF transceiver front-end circuit to the primary RF reception path.

15. The invention of claim 2, wherein at least one switchable internal calibration path is a switchable bypass circuit calibration path between at least one RF transceiver front-end circuit and the primary RF reception path and configured to convey, in the calibration mode, the test signal from the primary RF transmission path through such at least one RF transceiver front-end circuit directly to the primary RF reception path.

16. The invention of claim 15, wherein at least one RF transceiver front-end circuit includes an input/output circuit, and wherein at least one switchable bypass circuit calibration path is a bypass periphery circuit calibration path configured to convey, in the calibration mode, the test signal from the primary RF transmission path through at least a portion of such input/output circuit of such at least one RF transceiver front-end circuit directly to the primary RF reception path.

17. The invention of claim 2, wherein the test signal is conveyed through at least two RF transceiver front-end circuits.

18. The invention of claim 2, further including at least one inter-chip switch for providing selectable access from external to the RF integrated circuit to at least one of the primary RF transmission path, the primary RF reception path, and/or the at least one switchable internal calibration path.

19. The invention of claim 2, wherein, in a calibration mode, the at least one switchable internal calibration path and a first and a second of the at least one RF transceiver front-end circuits are configured to:
   (a) convey the test signal from the primary RF transmission path through the first RF transceiver front-end circuit for over-the-air transmission by a first antenna coupled to the first RF transceiver front-end circuit, and
   (b) convey a received over-the-air transmission of the RF test signal from a second antenna coupled to the second RF transceiver front-end circuit through the second RF transceiver front-end circuit to the primary RF reception path.

* * * * *